United States Patent
Hao et al.

(10) Patent No.: US 12,299,558 B1
(45) Date of Patent: May 13, 2025

(54) SYSTEM FOR TRAINING AND DEPLOYING GENERATIVE LANGUAGE MODEL FOR FORMULATING INSTRUCTIONS FOR FACILITY ASSET AND UPDATING DIFFERENT MAP TYPES OF FACILITY

(71) Applicants: Alston Hao, Diamond Bar, CA (US); Alvin Hao, Diamond Bar, CA (US)

(72) Inventors: Alston Hao, Diamond Bar, CA (US); Alvin Hao, Diamond Bar, CA (US)

( * ) Notice: Subject to any disclaimer, the term of this patent is extended or adjusted under 35 U.S.C. 154(b) by 0 days.

(21) Appl. No.: 18/506,090

(22) Filed: Nov. 9, 2023

(51) Int. Cl.
*G06N 3/0475* (2023.01)

(52) U.S. Cl.
CPC .................. *G06N 3/0475* (2023.01)

(58) Field of Classification Search
CPC .................................................. G06N 3/0475
See application file for complete search history.

(56) References Cited

U.S. PATENT DOCUMENTS

| | | | | |
|---|---|---|---|---|
| 2003/0013146 A1* | 1/2003 | Werb | ........... | G01V 15/00 435/6.12 |
| 2024/0264604 A1* | 8/2024 | Kugou | ........... | G05D 1/226 |

OTHER PUBLICATIONS

Motamedi et al. Localization of RFID-equipped assets during the operation phase of facilities. Advanced Engineering Informatics 27 (2013) 566-579 (Year: 2013).*
Ma et al. Intelligent Warehouse Robot Scheduling System Using a Modified Nondominated Sorting Algorithm. Discrete Dynamics in Nature and Society vol. 2022, Article ID 2021535, 12 pages (Year: 2022).*
Cedrola, Elena. International Marketing. UNIMC Universita Di Macerata. 2019 (Year: 2019).*
Lamballais et al. Estimating performance in a Robotic Mobile Fulfillment System. European Journal of Operational Research 256 (2017) 976-990. (Year: 2017).*
Asmar et al. Automated building and evaluation of 2D as-built floor plans. Machine Vision and Applications (2022) 33:36 (Year: 2022).*
Lee et al. Mobile Robot Path Optimization Technique Based on Reinforcement Learning Algorithm in Warehouse Environment. Appl. Sci. 2021, 11, 1209. (Year: 2021).*
Bowen-Biggs et al. Sketched Floor plans versus SLAM maps: A Comparison. 2016 (Year: 2016).*
Aoki et al. A Prototype System for Interpreting Hand-Sketched Floor Plans. Proceedings of ICPR '96 (Year: 1996).*

* cited by examiner

*Primary Examiner* — Michelle T Bechtold
*Assistant Examiner* — Robert Bejcek, II
(74) *Attorney, Agent, or Firm* — Foley & Lardner LLP

(57) ABSTRACT

The arrangements of the present disclosure are directed to systems, methods, and non-transitory computer-readable media for receive natural language input corresponding to a task to be performed by a dynamic asset within a facility, determine, using a Machine Learning (ML) model, first instructions for the dynamic asset to perform the task by applying the natural language input as a first input to the ML model. The first instructions includes a first location to which the dynamic asset is to move. The ML model receives feedback information comprising a metric determined using a current location of the dynamic asset. The ML model is updated using the current location of the dynamic asset. The ML model determines second instructions for the dynamic asset to perform the task, wherein the second instructions comprises a second location to which the dynamic asset is to move.

9 Claims, 16 Drawing Sheets

400

| Tag ID | Asset Type | Asset Name | Asset ID | Product Code |
|---|---|---|---|---|
| ID-A | Semi-Dynamic | Pallet | Pallet-ID | SKU-A<br>SKU-B |
| ID-B | Semi-Dynamic | Box | Box-ID | SKU-C |
| ID-C | Dynamic | Personnel | Personnel-ID | N/A |
| ID-D | Dynamic | Forklift | Forklift-ID | N/A |
| ID-E | Stationary | Rack | Rack-ID | N/A |
| ID-F | Semi-Dynamic | Reference-Danger | Beacon-ID | N/A |
| ID-G | Semi-Dynamic | Reference-Loading | Beacon-ID | N/A |
| ID-H | Semi-Dynamic | Reference-Unloading | Beacon-ID | N/A |

FIG. 4

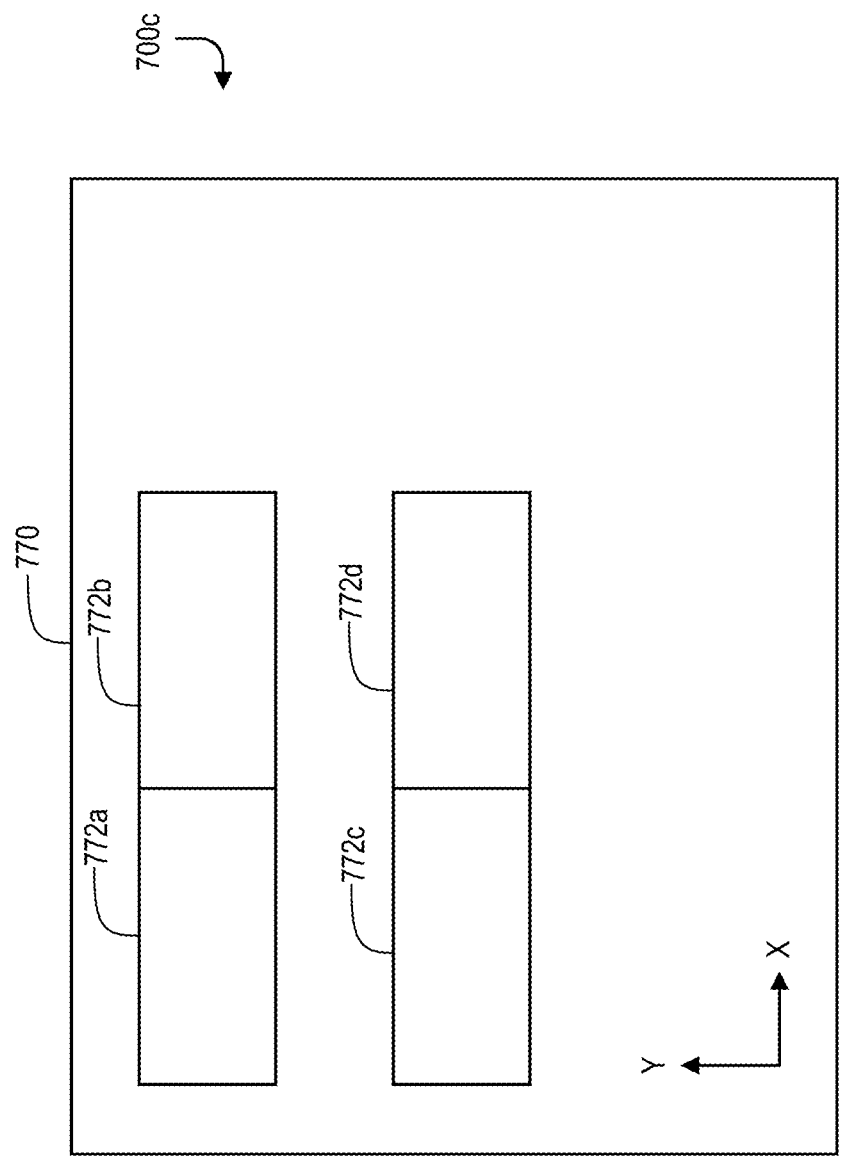

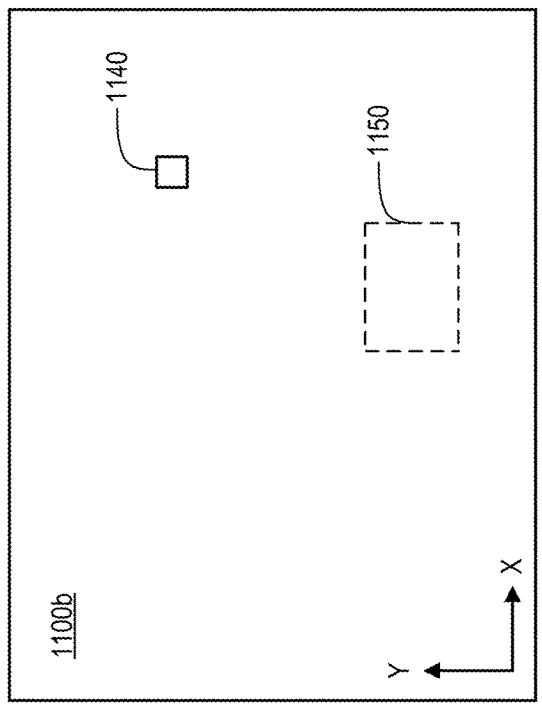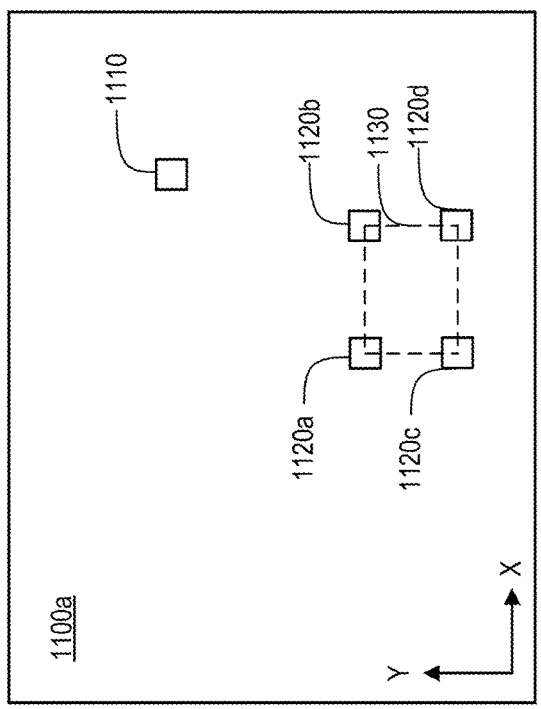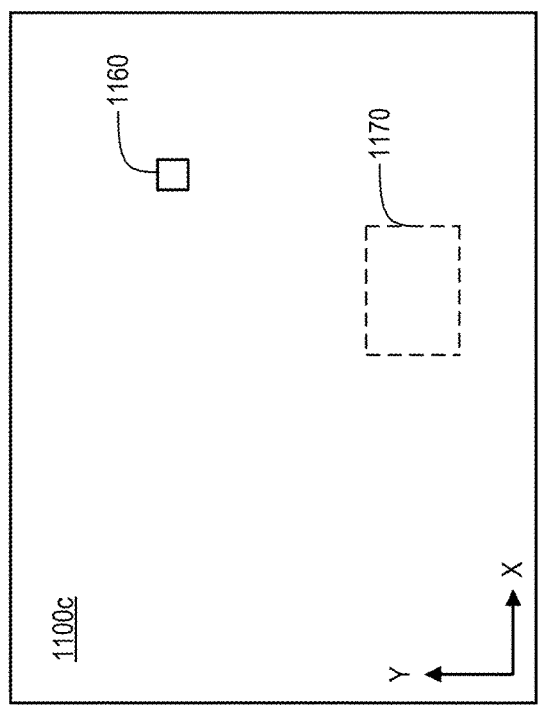

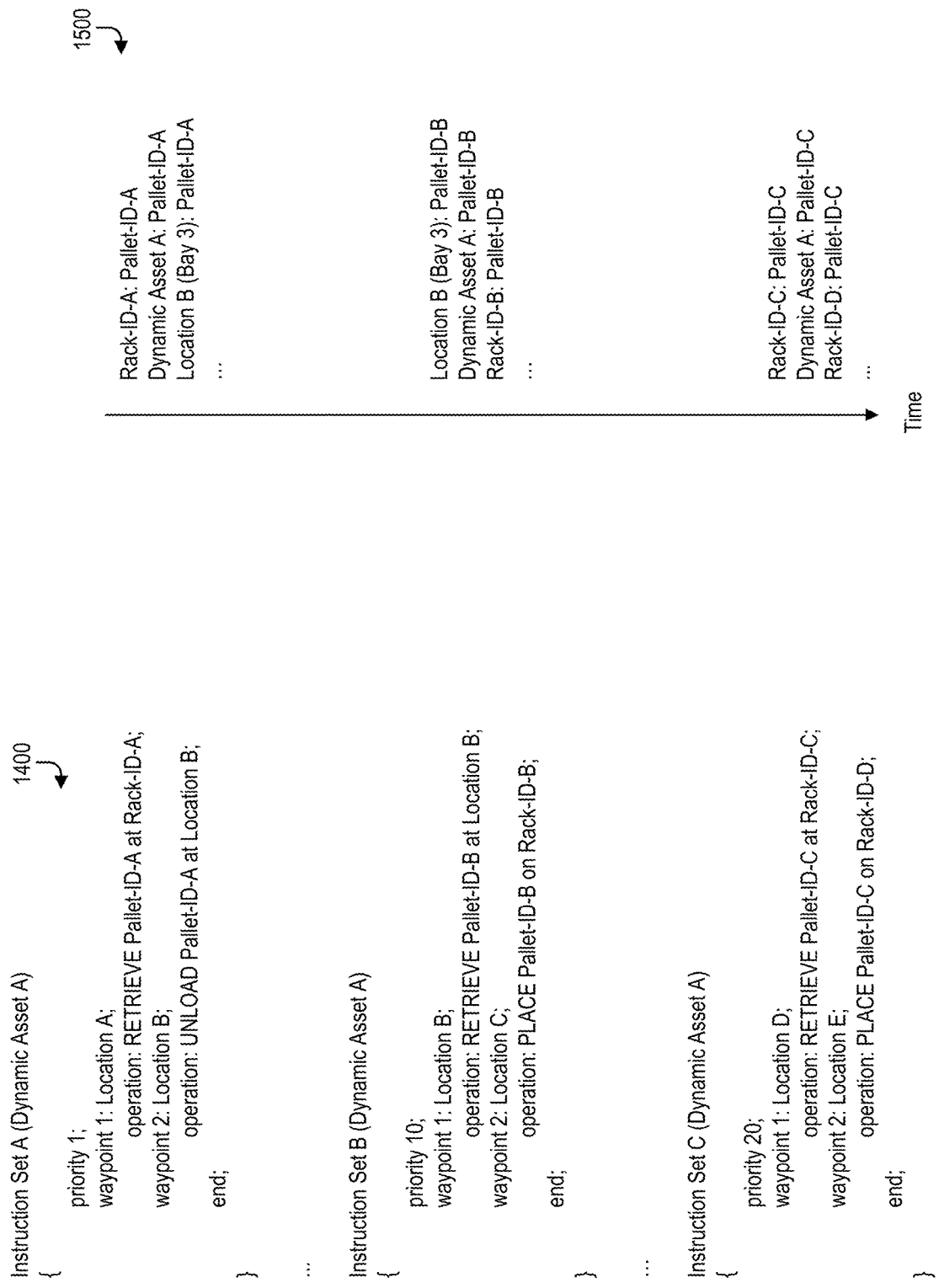

SYSTEM FOR TRAINING AND DEPLOYING GENERATIVE LANGUAGE MODEL FOR FORMULATING INSTRUCTIONS FOR FACILITY ASSET AND UPDATING DIFFERENT MAP TYPES OF FACILITY

TECHNICAL FIELD

The present disclosure relates to Artificial Intelligence (AI) and Machine Learning (ML) algorithms for managing, mapping, and controlling assets in a facility.

BACKGROUND

Conventional automated warehouse mapping and management tools lack granularity in real-time information on moving assets such as forklifts, personnel, and goods being stored. In addition, multiple different systems, software, platforms that separately govern personnel, inventory management, autonomous vehicles, and so on are conventionally used for effective warehouse management.

SUMMARY

The arrangements of the present disclosure are directed to systems, methods, and non-transitory computer-readable media for receive natural language input corresponding to a task to be performed by a dynamic asset within a facility, determine, using a Machine Learning (ML) model, first instructions for the dynamic asset to perform the task by applying the natural language input as a first input to the ML model. The first instructions includes a first location to which the dynamic asset is to move. The first instructions are sent to the dynamic asset via a network. The ML model receives feedback information comprising a metric determined using a current location of the dynamic asset. The current location is determined based on a distance between a tag and each of two or more stationary assets, using a location of each of the two or more stationary assets and a Time-of-Flight (ToF) of a signal communicated between the tag and each of the two or more stationary assets. The ML model is updated using the current location of the dynamic asset. The ML model determines second instructions for the dynamic asset to perform the task, wherein the second instructions comprises a second location to which the dynamic asset is to move.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

FIG. 4 is an example mapping that shows tag IDs and associated attributes, according to some arrangements.

FIG. 7C is an example of a third map, according to various arrangements.

FIG. 11A is an example of a first map, according to various arrangements.

FIG. 11B is an example of a second map, according to various arrangements.

FIG. 11C is an example of a third map, according to various arrangements.

FIG. 14 is an example pseudocode instructions corresponding to an example of the instructions, according to various arrangements.

FIG. 15 is a diagram illustrating assignment information stored in the records database as updated by the instructions outputted by the ML model, according to various of arrangements.

DETAILED DESCRIPTION

The detailed description set forth below in connection with the appended drawings is intended as a description of various configurations and is not intended to represent the only configurations in which the concepts described herein may be practiced. The detailed description includes specific details for providing a thorough understanding of various concepts. However, it will be apparent to those skilled in the art that these concepts may be practiced without these specific details. In some instances, well-known structures and components are shown in block diagram form in order to avoid obscuring such concepts.

Figure 1:
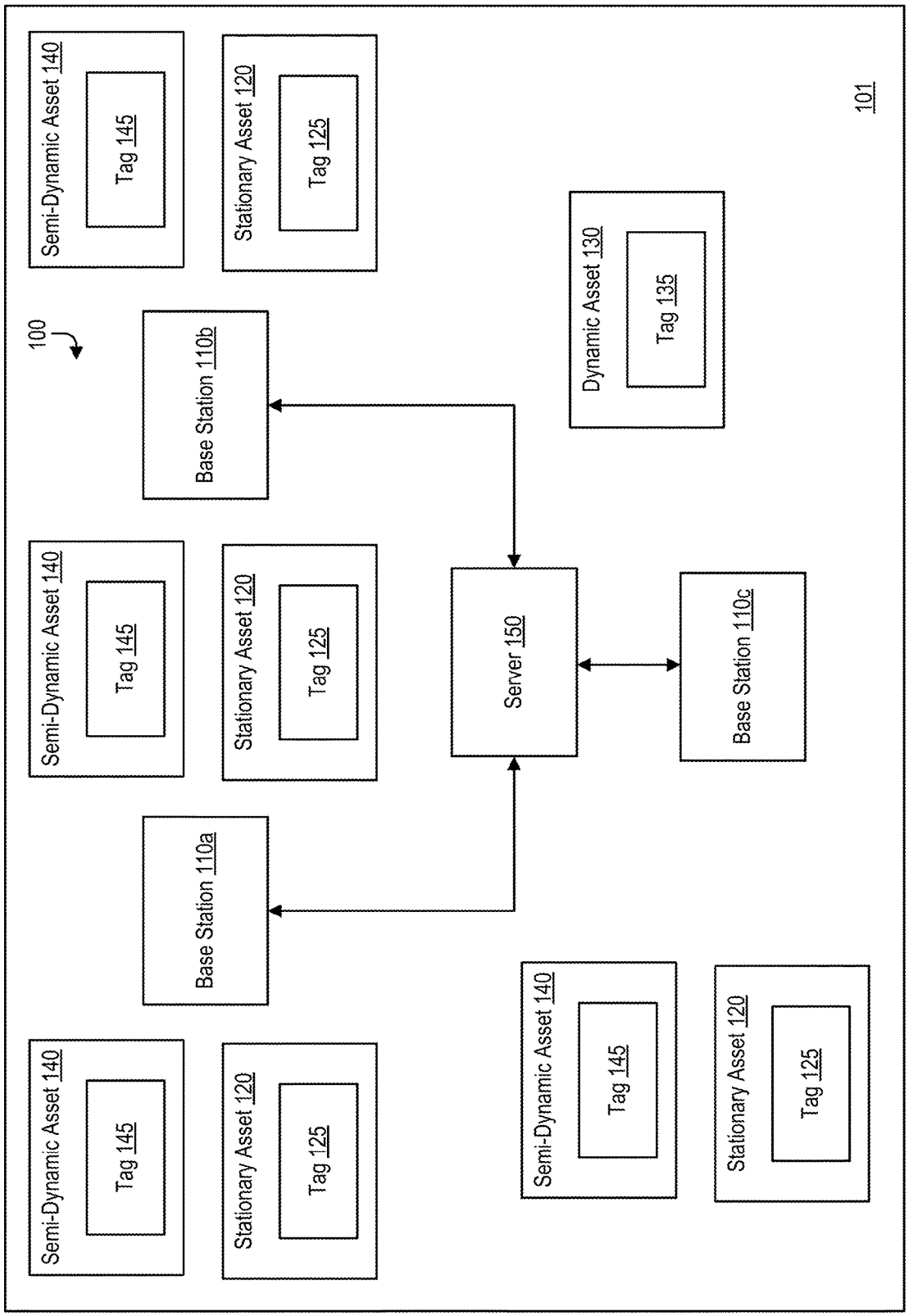
FIG. 1 is a diagram illustrating an example facility asset management system, according to various arrangements.

Arrangements disclosed herein relate to systems, apparatuses, methods, and non-transitory computer-readable media for determining real-time locations of various assets such as stationary (static) assets, dynamic (movable) assets, and semi-dynamic assets in a facility and providing an integrated system to manage such assets. FIG. 1 is a diagram illustrating an example facility asset management system 100, according to various arrangements. The facility asset management system 100 can be implemented for a facility 101. An example of the facility 101 includes a warehouse, inventory management facility, a storage space, a logistic center, factory, or another suitable space configured to store or to allow movement of various assets disclosed herein. The system 100 includes two or more base stations (e.g., base stations 110a, 110b, and 110c), tags (e.g., tags 125, 135, and 145) provided on respective assets (e.g., at least one stationary asset 120, at least one dynamic asset 130, and at least one semi-dynamic asset 140), and server 150.

Examples of stationary assets 120 can include racks, shelves, fixed containers, storage spaces defined thereby, and so on used to hold pallets or objects, referred to as the semi-dynamic assets 140. The stationary assets 120 can include stationary reference positions. For example, walls, floor, ceiling, doors, loading docks, gates, posts, beams, fixed racks, fixed shelves, and fixed containers are examples of stationary reference positions. In some examples, the stationary asset 120 refers to an element having a location that is considered to be fixed and can be used as a reference location for the dynamic assets 130 and semi-dynamic assets 140 and 150 as described herein.

Examples of dynamic assets 130 include vehicles, human operators, and so on that can move within the facility 101. Examples of vehicles include forklifts, trucks, Unmanned Aerial Vehicles (UAVs), Unmanned Ground Vehicles (UGVs), autonomous forklifts, driverless robotic forklifts, and so on. In some examples, the dynamic asset 130 refers to an element that is frequently moved, whether autonomously or driver by human operators.

Examples of semi-dynamic assets 140 include support platforms (e.g., pallets), products, and so on that can be moved from time to time by for example the dynamic assets 130. Within the content of inventory or warehouse management, a semi-dynamic asset 140 may be moved from a first temporary location to a second temporary location, and later to a third temporary location, and so on, such that tracking of the temporary locations is needed. The semi-dynamic assets 140 can also include semi-dynamic reference points or temporary reference points, which can be reference points (e.g., cones, flags, stands, poles, stickers, and so on) that can be moved from time to time to designate a certain area for a utility (e.g., loading area, unloading area, danger area, and so on).

A tag 125, 135, or 145 can be included (e.g., fixedly or removably attached) on each stationary asset 120, each dynamic asset 130, and each semi-dynamic asset 140. For example, a tag can be attached to a respective asset using at least one of one or more nails, one or more screws, glue, one or more clips, one or more clamps, Velcro, magnets, or so on. The tags 125, 135, and 145 are configured to communicate wirelessly with the base stations 110a, 110b, and 110c to determine the distance between each of the tags 125, 135, and 145 and each of the base stations 110a, 110b, and 110c. The tags 125, 135, and 145 includes suitable wireless communication capabilities as described herein.

The base stations 110a, 110b, and 110c can be located throughout the facility 101 to communicate with the tags 125, 135, and 145 wirelessly to determine the locations of the assets 130, 140, and 150. In some examples, one or more of the base stations 110a, 110b, and 110c can be located on a ceiling of the facility 101, such as the surface of the ceiling facing the tags 125, 135, and 145 and the assets 130, 140, and 150. In some examples, one or more of the base stations 110a, 110b, and 110c can be located on a support beam or structure that structurally supports a ceiling of the facility 101 that faces the tags 125, 135, and 145 and the assets 130, 140, and 150. In some examples, one or more of the base stations 110a, 110b, and 110c can be located on a side wall or a floor of the facility 101 that faces the tags 125, 135, and 145 and the assets 130, 140, and 150.

The base stations 110a, 110b, and 110c are configured to be in communication of the server 150. The server 150 can receive, from the base stations 110a, 110b, and 110c, data (e.g., measured distance between each of the tags 125, 135, and 145 and each of the base stations 110a, 110b, and 110c) and determine the location of each of the assets 130, 140, and 150 using the data. The server 150 can generate a first map of the facility 101 using the locations of the assets 130, 140, and 150. The first map can be defined using a suitable coordinate system (e.g., a 2D or 3D Cartesian coordinate system).

Figure 2:
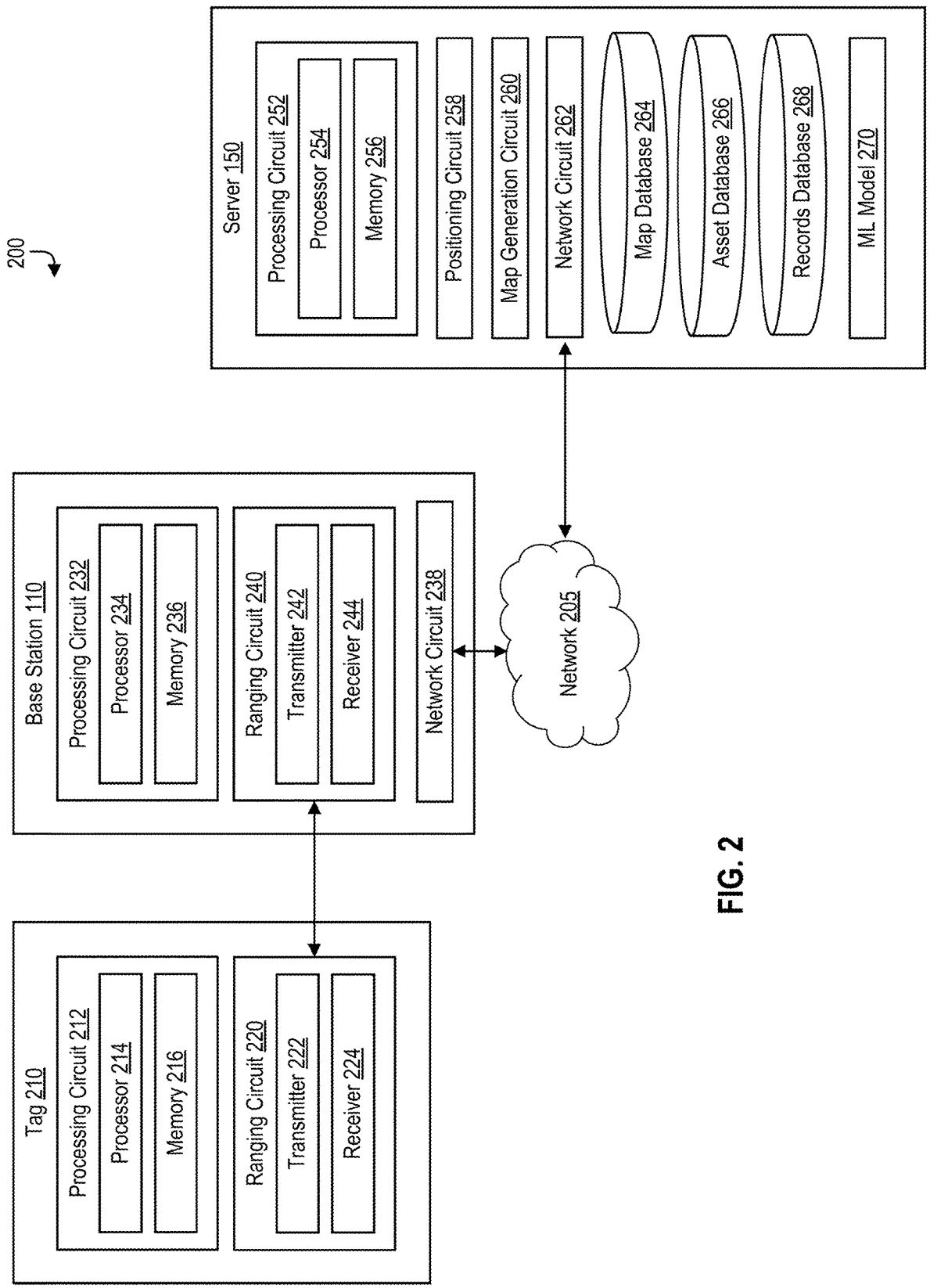
FIG. 2 is a diagram illustrating an example system, according to various arrangements.

FIG. 2 is a diagram illustrating an example system 200, according to various arrangements. The system 200 is a part of the facility asset management system 100 implemented for the facility 101. Referring to FIGS. 1 and 2, the tag 210 is an example implementation of any of the tags 125, 135, and 145. The tag 210 can be in wireless communication with the base station 110, which is an example implementation of any of the base stations 110a, 110b, and 110c. The base station 110 can be communication with the server 150 via the network 205. The tag 210 can include suitable power source or connect configured to power the circuits described herein.

The tag 210 includes a processing circuit 212, which has a processor 214 and the memory 216. The processor 214 can be implemented as a single-chip or multi-chip processor, at least one Digital Signal Processor (DSP), at least one Application Specific Integrated Circuit (ASIC), at least one Field Programmable Gate Array (FPGA), at least one Graphics Processing Unit (GPU), at least one Central Processing Unit (CPU), or other programmable logic device, discrete gate or transistor logic, discrete hardware components, a combination thereof, or so on, as designed to perform the functions described herein. The processor 214 can be a suitable processor, a microprocessor, a group of processors, a combination thereof, or so on. The processor 214 can be implemented as a combination of computing devices, such as a combination of a DSP and a microprocessor, a plurality of microprocessors, one or more microprocessors in conjunction with a DSP core, a combination thereof, or so on. The processor 214 can be used to implement one or more circuits, devices, or elements, shown as blocks of within the tag 210. For example, the processor 214 can be one or more processors that are shared by multiple circuits, devices, or elements of the tag 210. The processor 214 can be one or more processors structured to perform or otherwise execute certain operations independent of one or more co-processors. The processor 214 can be two or more processors coupled via a bus to enable independent, parallel, pipelined, or multi-threaded instruction execution. All such variations are intended to fall within the scope of the present disclosure.

The memory 216 stores data and/or computer code for facilitating at least some of the various processes described herein. The memory 216 can include at least one Random Access Memory (RAM), at least one Read-Only Memory (ROM), at least one Non-Volatile RAM (NVRAM), at least one flash memory, at least one hard disk storage, a combination thereof, or so on. The memory 216 includes tangible, non-transient volatile memory or non-volatile memory. The memory 216 can include at least one non-transitory processor readable medium having stored programming logic that, when executed by the processor 214, controls the operations of the tag 210. Accordingly, the memory 216 may include database components, object code components, script components, or any other type of information structure for supporting the various activities and information structures described herein with respect to the tag 210.

The base station 110 includes a processing circuit 232 having a processor 234 and a memory 236. The processor 234 can be implemented as a single-chip or multi-chip processor, at least one DSP, at least one ASIC, at least one FPGA, at least one GPU, at least one CPU, or other programmable logic device, discrete gate or transistor logic, discrete hardware components, a combination thereof, or so on, as designed to perform the functions described herein. The processor 234 can be a suitable processor, a microprocessor, a group of processors, a combination thereof, or so on. The processor 234 can be implemented as a combination of computing devices, such as a combination of a DSP and a microprocessor, a plurality of microprocessors, one or more microprocessors in conjunction with a DSP core, a combination thereof, or so on. The processor 234 can be used to implement one or more circuits, devices, or elements, shown as blocks of within the base station 110. For example, the processor 234 can be one or more processors that are shared by multiple circuits, devices, or elements of the base station 110. The processor 234 can be one or more processors structured to perform or otherwise execute certain operations independent of one or more co-processors. The processor 234 can be two or more processors coupled via a bus to enable independent, parallel, pipelined, or multi-threaded instruction execution. All such variations are intended to fall within the scope of the present disclosure.

The memory 236 stores data and/or computer code for facilitating at least some of the various processes described herein. The memory 236 can include at least one RAM, at least one ROM, at least one NVRAM, at least one flash memory, at least one hard disk storage, a combination thereof, or so on. The memory 236 includes tangible, non-transient volatile memory or non-volatile memory. The memory 236 can include at least one non-transitory processor readable medium having stored programming logic that, when executed by the processor 234, controls the operations of the base station 110. Accordingly, the memory 236 may include database components, object code components, script components, or any other type of information structure for supporting the various activities and information structures described herein with respect to the base station 110. All such variations are intended to fall within the scope of the present disclosure.

The ranging circuit 220 of the tag 210 is configured to communicate with the ranging circuit 240 of the base station 110 to determine the distance between the base station 110 and the tag 210. The ranging circuit 220 includes at least one transmitter 222, at least one receiver 224, and suitable wireless transmission control capabilities such as a baseband processor which can be implemented using the processing circuit 212. The ranging circuit 240 includes at least one transmitted 242, at least one receiver 244, and suitable wireless transmission control capabilities such as a baseband processor which can be implemented using the processing circuit 212. The transmitter 222 can transmit wireless signals to be received by the receiver 244. The transmitter 242 can transmit wireless signals to be received by the receiver 224. The distance between the tag 210 and the base station 110 can be determined based at least in part on at least one of the signal transmitted from the transmitter 222 to the receiver 244 and the signal transmitted from the transmitter 242 to the receiver 224.

In some arrangements, the tag 210 and the base station 110 can implement radio technologies such as Ultra-Wide Band (UWB) specified in IEEE802.15.4, Near Field Communication (NFC) (e.g., long-range NFC), Bluetooth Low Energy (BLE), WiFi, cellular (e.g., 4G, 5G, 6G, LTE, etc.) and so on. For example, the transmitters 222 and 242 can transmit UWB, NFC, BLE, WiFi, or cellular signals, and the receivers 224 and 244 can receive UWB, NFC, BLE, WiFi, or cellular signals. With regard to UWB, the transmitters 222 and 242 can transmit wireless signals over a wide bandwidth (e.g., 500 MHz) using fast pulses or continuous pulses.

In some arrangements, the distance between the base station 110 and the tag 210 can be measured using Time-of-Flight (ToF) of at least one of the signal transmitted from the transmitter 222 to the receiver 244 and the signal transmitted from the transmitter 242 to the receiver 224. In a Round Trip Time (RTT) method in which the base station 110 is the initiator, the transmitter 242 can send a first signal at timestamp $T_0$, which the receiver 224 receives at timestamp $T_1$. After a reply time $T_R$, the transmitter 222 sends a second signal at timestamp $T_2$, which the receiver 244 receives at timestamp $T_3$. The roundtrip time RTT is the difference between $T_3$ and $T_0$. In this case, the ToF can be determined as:

$$ToF = \frac{RTT - T_R}{2}. \quad (1)$$

In some examples, expression (1) can also be used in a situation in which the tag 210 is the initiator. For example, the transmitter 222 can send a first signal at timestamp $T_0$, which the receiver 244 receives at timestamp $T_1$. After a reply time $T_R$, the transmitter 242 sends a second signal at timestamp $T_2$, which the receiver 224 receives at timestamp $T_3$. The roundtrip time RTT is the difference between $T_3$ and $T_0$. The distance between the base station 110 and the tag 210 can be obtained by multiplying the speed of light with the ToF.

In some arrangements, the distance between the base station 110 and the tag 210 can be measured using signal strength determined by the ranging circuit 220 for a signal received by the receiver 224 from the transmitter 242 and/or a signal strength determined the ranging circuit 240 for a signal received by the receiver 244 from the transmitter 222. The signal strength can be mapped to a distance according to a suitable mapping table.

In some arrangements, the processing circuit 232 can be configured to determine the distance between the base station 110 and the tag 210 based on data provided by the ranging circuit 240 and the ranging circuit 220. The ranging circuit 220 can use the transmitter 222 to send relevant data (e.g., the timestamps) to the receiver 244 of the ranging circuit 240. The network circuit 238 can send the distance information to the network circuit 262 of the server 150. The network circuit 238 is structured for sending and receiving data over the network 205, for example, to and from the server 150 and one or more other suitable devices. Accordingly, the network circuit 238 includes at least one cellular transceiver (for cellular standards), at least one local wireless network transceiver (e.g., 802.11X, ZigBee, Bluetooth, Wi-Fi, or so on), wired network interface, a combination thereof (e.g., both a cellular transceiver and a Bluetooth transceiver), or the like.

The base station 110 can be communicably coupled or connected to the server 150 via the network 205. Examples of the network 205 can include any suitable wired or wireless network, such as the Ethernet, wireless Local Area Network (LAN), Wide Area Network (WAN), wireless cellular networks (such as 4G, LTE, 5G, 6G, etc.), Personal Communications Service (PCS), 802.11X, ZigBee, Bluetooth, Wi-Fi, and so on. The network 205 is structured to permit the exchange of data, values, instructions, messages, and the like between the base station 110 and the server 150.

The server 150 includes a processing circuit 252 having a processor 254 and a memory 256. The processor 254 can be implemented as a single-chip or multi-chip processor, at least one DSP, at least one ASIC, at least one FPGA, at least one GPU, at least one CPU, or other programmable logic device, discrete gate or transistor logic, discrete hardware components, a combination thereof, or so on, as designed to perform the functions described herein. The processor 254 can be a suitable processor, a microprocessor, a group of processors, a combination thereof, or so on. The processor 254 can be implemented as a combination of computing devices, such as a combination of a DSP and a microprocessor, a plurality of microprocessors, one or more microprocessors in conjunction with a DSP core, a combination thereof, or so on. The processor 254 can be used to implement one or more circuits, devices, or elements, shown as blocks of within the server 150. For example, the processor 254 can be one or more processors that are shared by multiple circuits, devices, or elements of the server 150. The processor 254 can be one or more processors structured to perform or otherwise execute certain operations independent of one or more co-processors. The processor 254 can be two or more processors coupled via a bus to enable independent, parallel, pipelined, or multi-threaded instruction execution. All such variations are intended to fall within the scope of the present disclosure.

The memory 256 stores data and/or computer code for facilitating at least some of the various processes described herein. The memory 256 can include at least one RAM, at least one ROM, at least one NVRAM, at least one flash memory, at least one hard disk storage, a combination thereof, or so on. The memory 256 includes tangible, non-transient volatile memory or non-volatile memory. The memory 256 can include at least one non-transitory processor readable medium having stored programming logic that, when executed by the processor 254, controls the operations of the server 150. Accordingly, the memory 256 may include database components, object code components, script components, or any other type of information structure for supporting the various activities and information structures described herein with respect to the server 150. All such variations are intended to fall within the scope of the present disclosure.

The positioning circuit 258 is configured to determine the location of each tag 210, and therefore the location of each asset 130, 140, or 150 on which the tag 210 is operatively coupled. For example, the positioning circuit 258 can use the distance between the tag 210 and each base station 110 of multiple base stations (e.g., 110a, 110b, and 110c) to determine a location of the tag 210, as described herein. The positioning circuit 258 can provide the locations of each tag 210 to the map generation circuit 260 for generating and updating one or more maps, as described herein.

The map generation circuit 260 is configured to generate and update a map of the facility 101 based on the location of the tags 125, 135, 145 (210), referred to as the first map. The map generation circuit 260 can use the first map to update another map, such as a second map generated and/or used by an autonomous vehicle or a third map (e.g., a floorplan) corresponding to the design and layout of fixed features (e.g., the stationary assets 120) of the facility 101. Examples of the second map include a Simultaneous Localization and Mapping (SLAM) map. Example of the third map include an Computer-Aided Design (CAD) drawing in a file such as DWG, RFA, DXF, PLN, DGN, and so on. One or more of the first map, second map, and third map can be stored in the map database 264. The map generation circuit 260 can update the maps stored in the map database 264 as the location of any of the tags 125, 135, 145 (210) change.

The network circuit 262 is structured for sending and receiving data over the network 205, for example, to and from the base station 110 and one or more other suitable devices. Accordingly, the network circuit 262 includes at least one cellular transceiver (for cellular standards), at least one local wireless network transceiver (e.g., 802.11X, ZigBee, Bluetooth, Wi-Fi, or so on), wired network interface, a combination thereof (e.g., both a cellular transceiver and a Bluetooth transceiver), or the like.

Figure 3:
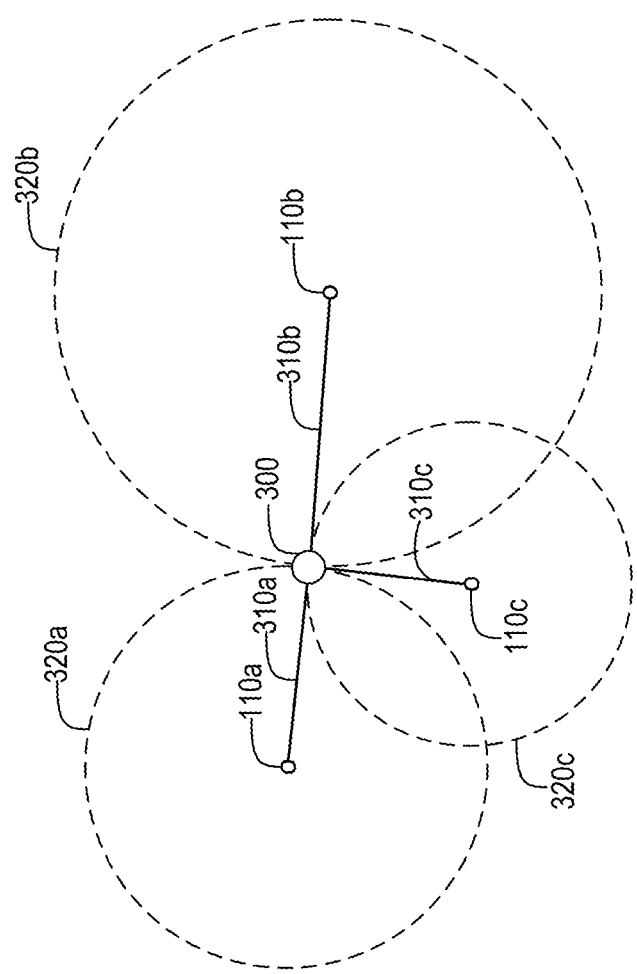
FIG. 3 is a diagram illustrating an example method for determining the location of a tag, according to some arrangements.

In some examples, the location of a tag can be determined using suitable ranging algorithms such as trilateration. FIG. 3 is a diagram illustrating an example method for determining the location of a tag 300, according to some arrangements. Referring to FIGS. 1-3, the base stations 110a, 110b, and 110c can each determine a distance 310a, 310b, or 310c to the tag 300, examples of which include 1245, 135, 145, and 210. For example, the distance between the base station 110a and the tag 300 can be measured using ToF of at least one of the signal transmitted from the transmitter 222 of the tag 300 to the receiver 244 of the base station 110a and the signal transmitted from the transmitter 242 of the base station 100a to the receiver 224 of the tag 300. For example, using the RTT method, the ToF can be determined using expression (1). The distance 310a between the base station 110a and the tag 300 can be determined by multiplying the ToF with the speed of light. The distance 310b between the base station 110b and the tag 300 can be similarly determined by the base station 110b. The distance 310c between the base station 110c and the tag 300 can be similarly determined by the base station 110c. Each of the base stations 110a, 110b, and 110c can send the respective distance 310a, 310b, or 310c to the server 150. The positioning circuit 258 can determine the location of the tag 300 based on the distances 310a, 310b, and 310c, and the known locations of the base stations 110a, 110b, and 110c.

The positioning circuit 258 can generate a sphere 320a with the determined distance 310a as the radius and the center being the known location of the base station 110a, defined by a set of coordinates, e.g., Cartesian coordinates $(x_a, y_a, z_a)$. The positioning circuit 258 can generate a sphere 320b with the determined distance 310b as the radius and the center being the known location of the base station 110b, defined by another set of coordinates, e.g., Cartesian coordinates $(x_b, y_b, z_b)$. The positioning circuit 258 can generate a sphere 320c with the determined distance 310c as the radius and the center being the known location of the base station 110c, defined by another set of coordinates, e.g., Cartesian coordinates $(x_c, y_c, z_c)$. In the trilateration method, the intersection of the three spheres 320a, 320b, and 320c along the boundary surfaces can be determined to be the location of the tag 300, defined by a set of coordinates, e.g., Cartesian coordinates $(x_t, y_t, z_t)$. The spheres 320a, 320b, and 320c are represented as 2D circles for the sake of clarity.

Other methods for determining the location of the tag 300 can be used. For example, the location of the tag can be determined using the radii or distances 310a and 310b and the coordinates for the centers of two circles centered at the known 2D coordinates $(x_a, y_a)$ and $(x_b, y_b)$, respectively. In such examples, the 2D coordinates of the tag 300 $(x_t, y_t)$ can be determined to be the intersection of the circles centered at $(x_a, y_a)$ and $(x_b, y_b)$ with radii or distances 310a and 310b, respectively. In other examples, multilateration and triangulation using multiple base stations can be implemented to determine the location of a tag based on for example signal strength, angle of received signal, and so on.

The base stations 110a, 110b, and 110c and the tag 300 can communicate signals in the manner described periodically (e.g., every second, millisecond, etc.). The base stations 110a, 110b, and 110c can send the distances 310a, 310b, and 310c to the positioning circuit 258 periodically, allowing the positioning circuit 258 can determine the real-time location of the tag 300 periodically. This allows the real-time location of a dynamic asset 130 or a semi-dynamic asset 140 on which the tag 300 (e.g., the tag 135 or 145) is attached to be determined. In other words, the movement of the dynamic asset 130 and the semi-dynamic assets 140 can be tracked in real-time. In some arrangements, the transmitters 222a and 242 can transmit and the receivers 224 and 244 can receive continuous stream of UWB pulses (e.g., over 1,000,000,000 pulses per second), enabling continuous tracking of a tag that is moving even at fast speeds.

In some arrangements, the tags 125, 135, 145, and 300 can be associated with a suitable identifier (ID), referred to as a tag ID. The tag ID can be mapped to various attributes that identifies the asset on which the tag is arranged. FIG. 4 is an example mapping 400 that shows tag IDs and associated attributes or identity, according to some arrangements. Examples of the identity include asset type, asset name, asset ID, and product code.

The asset type includes one of dynamic (e.g., the dynamic asset 130), semi-dynamic (e.g., the semi-dynamic assets 140), and stationary (e.g., the stationary assets 120). Such classification allow the system to distinguish reference locations such as the locations of the stationary assets 120 from locations of dynamic assets 130 and semi-dynamic assets 140, thus allowing an additional layer of control and granularity. The asset name is the name of the asset, such as pallet, box (that contains products or goods), personnel (e.g., staff, workers, etc.), forklift or another vehicle such as UAV, UGV, etc., rack, and so on. The asset ID is the ID of the asset, if different from the tag ID. The asset ID identifies the asset while the tag ID identifies the tag, thus allowing the tag 125, 135, 145, or 300 identified by the same tag ID to be removed from an asset (identified by a first asset ID) and coupled to another asset (identified by a second asset ID). This provides flexibility in re-using the tags 125, 135, 145, and 300. The product code refers to IDs such as Stock Keeping Units (SKUs) or Universal Product Codes (UPCs) used to identify products and goods that are stored or arranged on pallets, boxes, containers, etc.

An operator may use a handheld device such as a barcode scanner to scan bar codes or other identifiers located on tags and bar codes or other identifiers located on the different assets to associate the tag ID with the assets and the attributes thereof, to populate the mapping table 400. The mapping table 400 can be stored in the asset database 266. In some examples, the operator can use the scanner to scan a first barcode located on a pallet containing boxes or containers of products and a second barcode located on an outward facing surface of a tag. The information represented by the first barcode is obtained from the asset database 266 as Pallet-ID. The information represented by the second barcode is obtained from the asset database 266 as tag ID ID-A. The asset name (pallet) and the asset type (semi-dynamic) can be populated automatically according to Pallet-ID which is mapped to a pallet that is semi-dynamic in the asset database 266. The operator can scan third barcodes located on boxes containing products that are placed on the pallet to determine the SKUs (SKU-A and SKU-B) corresponding to the third barcodes, where such mapping is stored in the in the asset database 266.

In some arrangements, a tag (e.g., tags ID-F, ID-G, ID-H) can be operatively coupled to a semi-dynamic reference point, temporary reference point, or beacon (e.g., cones, flags, stands, poles, stickers, and so on) that can be moved from time to time to designate a certain area for a utility (e.g., loading area, unloading area, danger area, and so on). The tags ID-F, ID-G, ID-H can have a semi-dynamic asset type and asset name of reference-danger, reference-loading, of reference unloading. The asset ID for the tags ID-F, ID-G, ID-H is a beacon-ID. Three or more beacons with tags provided thereon can be used to define a zone with a particular utility.

In some examples, the operator can use the scanner to scan a first barcode located on a box containing products and a second barcode located on an outward facing surface of a tag. The information represented by the first barcode is obtained from the asset database 266 as Box-ID and SKU-C. The information represented by the second barcode is obtained from the asset database 266 as tag ID ID-B. The asset name (box) and the asset type (semi-dynamic) can be populated automatically according to Box-ID which is mapped to a box that is semi-dynamic in the asset database 266. The mapping between the tag IDs and the Personnel-ID, Forklift-ID, and Rack-ID may be predetermined and stored in the asset database 266.

The transmitter 222 of the tag 210 can transmit a signal indicating of the tag ID of the tag 210 to the receiver 244 when sending a signal for ranging (e.g., in the Round Trip Time (RTT) method). The signal indicating the tag ID can be added to the signal for ranging using modulation, for example. In other examples, a separate signal can be transmitted by the transmitter 222 of the tag 210 to the receiver 244. In some examples, the bandwidth by which the signal for ranging is transmitted can correspond to the tag ID. The base station 110 can determine the tag ID accordingly and associate the distances determined between the bae station 110 and the tag with the tag ID, and forward the tag ID along with the determined distance to the server 150. This allows the server 150 to identify the tag ID and its distance from the base station 110.

Figure 5:
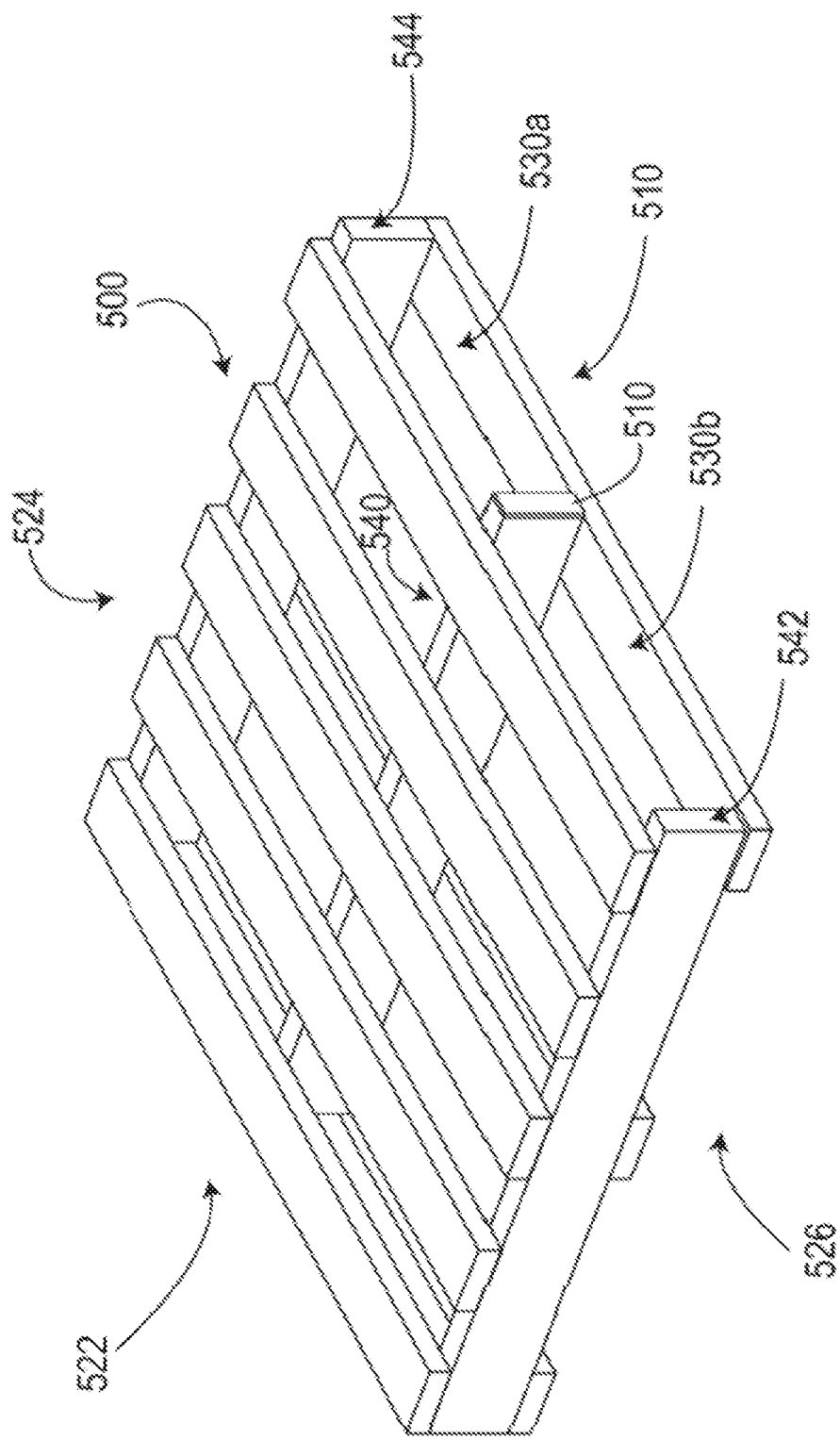
FIG. 5 is a diagram illustrating a support platform with a tag provided thereon, according to various arrangements.

FIG. 5 is a diagram illustrating a support platform 500 with a tag 510 provided thereon, according to various arrangements. The tag 510 is an example implementation of the tags 125, 135, 135, and 300. The support platform 500 is shown as a pallet and is an example implementation of the semi-dynamic asset 140. The support platform 500 includes a front face 520, a back face 522 opposite to the front face 520, a top face 524, and a bottom face 526 opposite to the top face 524. The top and bottom faces 524 and 526 extend between the front and back faces 520 and 522. The top face 524 supports or carries products, goods, merchandise, and containers, packaging, or boxes that enclose the same placed on the top face 524. The bottom face 526 can be placed on the floor, rack, or another suitable support surface.

In some examples, the tag 510 is removably attached to the front face 520 of the support platform 500 via one or more nails, one or more suitable coupling mechanisms, including at least one of screws, glue, one or more clips, one or more clamps, Velcro, magnets, or so on. In some examples, the tag 510 is placed along a center support beam 540 that extends between the front face 520 and the base face 533 along a center axis of the support platform 500. The front face 520 includes a first cavity 530a and a second cavity 530b. Two folks from a forklift can be inserted into the cavities 530a and 530b respectively toward the back face 522 to lift and move the support platform 500, with any items placed thereon. The tag 510 can be placed between the cavities 530a and 530b. When the forks of the forklift are inserted into the cavities 530a and 530b, the tag 510 and the front face 520 are facing the body of the forklift. As the support platform 500 is placed on a support surface such as the ground or the rack, the tag 510 and the front face 520 are oriented to face the path or corridor along which the forklift moves. In other words, the tag 510 is oriented to face an open space unobstructed by the racks, products, support platforms, and so on. This improves the accuracy of the ranging methods disclosed herein. In some examples, the tag 510 can be placed on a side support beam 542 or a side support beam 544. The side support beam 544 and the center support beam 540 define the cavity 530a. The side support beam 542 and the center support beam 540 define the cavity 530b.

Figure 6:
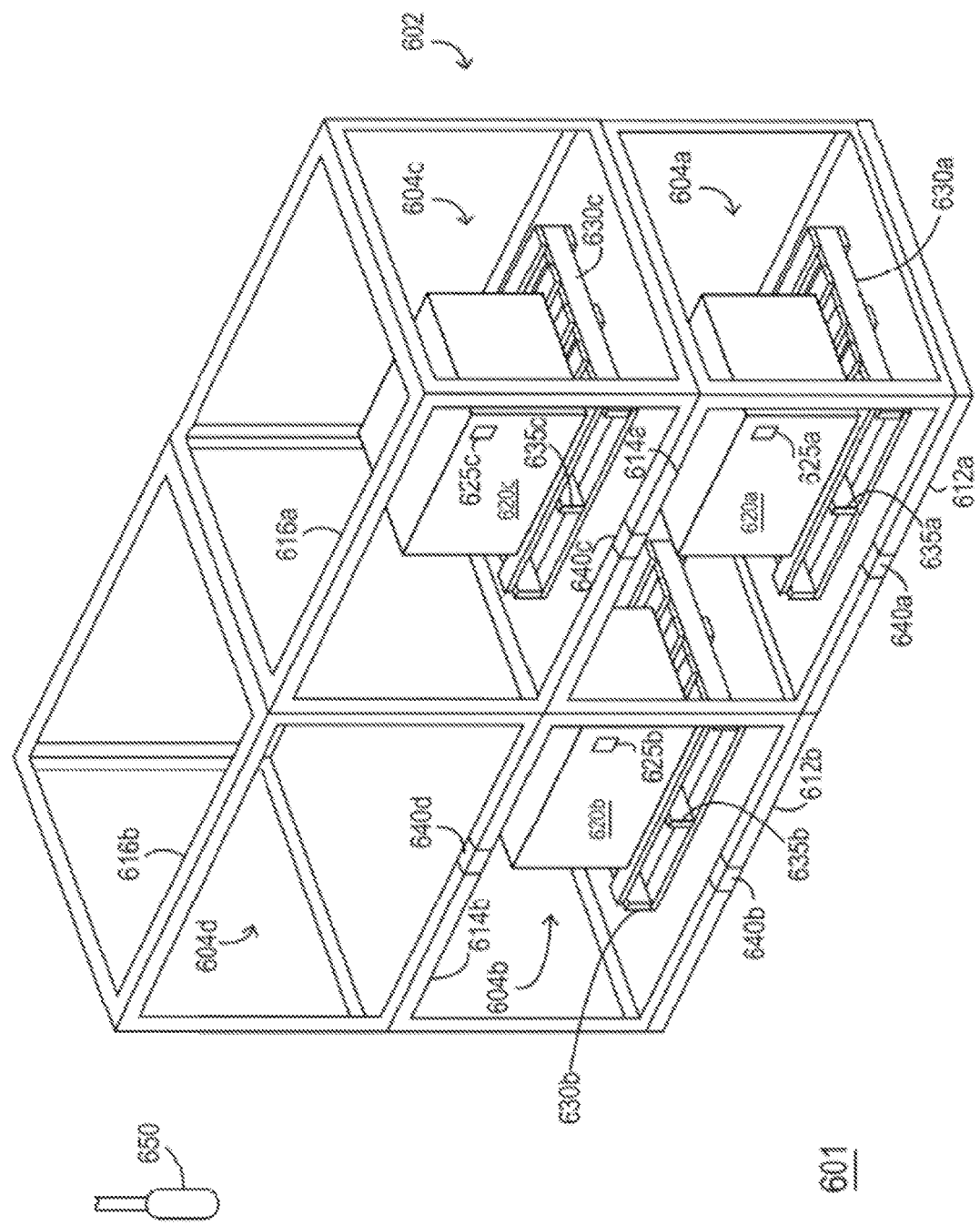
FIG. 6 is a diagram illustrating an example deployment of tags for determining real-time location of assets of a facility, according to various arrangements.

FIG. 6 is a diagram illustrating an example deployment of tags for determining real-time location of assets of a facility, according to various arrangements. FIG. 6 shows a portion of a facility such as the facility 101. Fixtures such as racks (e.g., a rack 602) and base stations (e.g., a base station 650) have fixed and known locations within the facility 101. The base stations, including the base station 650, are attached to, fixed to, or hanging from the ceiling (not shown) of the facility 101. The base stations, including the base station 650, is located above a corridor 601 on which the forklift, UAV, UGV, and personnel (e.g., the dynamic assets 130) can move. In other words, the base stations of the facility 101 are located along axes normal to a point on the planes or grounds defined by the corridor 601, where the dynamic assets 130 can move on such planes or grounds. This allows the base stations, including the base station 650, unobstructed Line-of-Sight (LoS) to the tags 625a, 625b, 625c, 635a, 635b, 635c, 640a, 640b, 640c, and 640d, thus improving ranging accuracy.

The rack 602 is an example of the stationary assets 120. The rack has multiple structural features, including the horizontal beams 640a, 640b, 640c, and 640d. The beams 640a, 640b, 640c, and 640d provide structural support for the support surfaces on which the support platforms 630a, 630b, and 630c, and boxes 620a, 620b, and 620c are placed. The beams 640a, 640b, 640c, and 640d and other beams and support surfaces define storage spaces 604a, 604b, 604c, and 604d for storing the support platforms 630a, 630b, and 630c, and boxes 620a, 620b, and 620c. The beams 640a, 640b, 640c, and 640d may have front faces facing the corridor 601 on which the forklift, UAV, UGV, and personnel (e.g., the dynamic assets 130) can move. In some examples, the tags 640a, 640b, 640c, and 640d can be located on the front faces of the beams 640a, 640b, 640c, and 640d. This allows the tags 640a, 640b, 640c, and 640d to have a direct, unobstructed LoS to the base stations, including the base station 650, without being blocked by the support platforms 630a, 630b, 630c, the boxes 620a, 620b, 620c, or other members of the rack 602, while not interfering with the forklift placing the support platforms 630a, 630b, 630c and the boxes 620a, 620b, 620c on the rack 602. The tags 640a, 640b, 640c, and 640d are example implementations of the tag 125.

Each of the support platforms 630a, 630b, and 630c is the support platform 500. Each of the tags 635a, 635b, and 635c is the tag 510. Each of the support platforms 630a, 630b, and 630c supports or carries a respective one of the boxes 620a, 620b, and 620c containing products, merchandise, or items, on the top faces 524 of the support platforms 630a, 630b, and 630c. The boxes 620a, 620b, and 620c each has a respective one of the tags 625a, 625b, and 625c provided thereon, e.g., using one or more suitable coupling mechanisms, including at least one of screws, glue, one or more clips, one or more clamps, Velcro, magnets, or so on. The tags 625a, 625b, 625c, 635a, 635b, and 635c are also oriented to face the corridor 601 to provide unobstructed LoS to the base stations, including the base station 650. For example, the tags 625a, 625b, and 625c can be attached to the boxes 620a, 620b, 620c while the boxes 620a, 620b, 620c are placed on the support platforms 630a, 630b, and 630c in a manner such that the tags 625a, 625b, and 625c and the respective ones of the tags 635a, 635b, and 635c face the same direction. For example, the boxes 620a, 620b, 620c with the tags 625a, 625b, and 625c already attached can be placed on respective ones of the support platforms 630a, 630b, and 630c in orientations such that the tags 625a, 625b, and 625c and the respective ones of the tags 635a, 635b, and 635c face the same direction. As the support platforms 630a, 630b, and 630c (with the boxes 620a, 620b, 620c) are placed on respective ones of the storage spaces 604a, 604b, 604c, and 604d, the tags 625a, 625b, 625c, 635a, 635b, 635c, 640a, 640b, 640c, and 640d face the corridor 601.

As shown, the tags 640a, 640b, 640c, and 640d are placed on a center of the respective beams 640a, 640b, 640c, and 640d defining a bottom of the respective storage spaces 604a, 604b, 604c, and 604d. This allows the tags 640a, 640b, 640c to be close to the tags 635a, 635b, and 635c of the support platforms 630a, 630b, and 630c when the support platforms 630a, 630b, and 630c are placed within the respective storage spaces 604a, 604b, and 604c. This allows improved accuracy in associating and verifying the association of the support platforms 630a, 630b, and 630c and the storage spaces 604a, 604b, and 604c based on the locations of the tags 640a, 640b, 640c and the locations of the tags 635a, 635b, and 635c in the manner described.

Figure 7A:
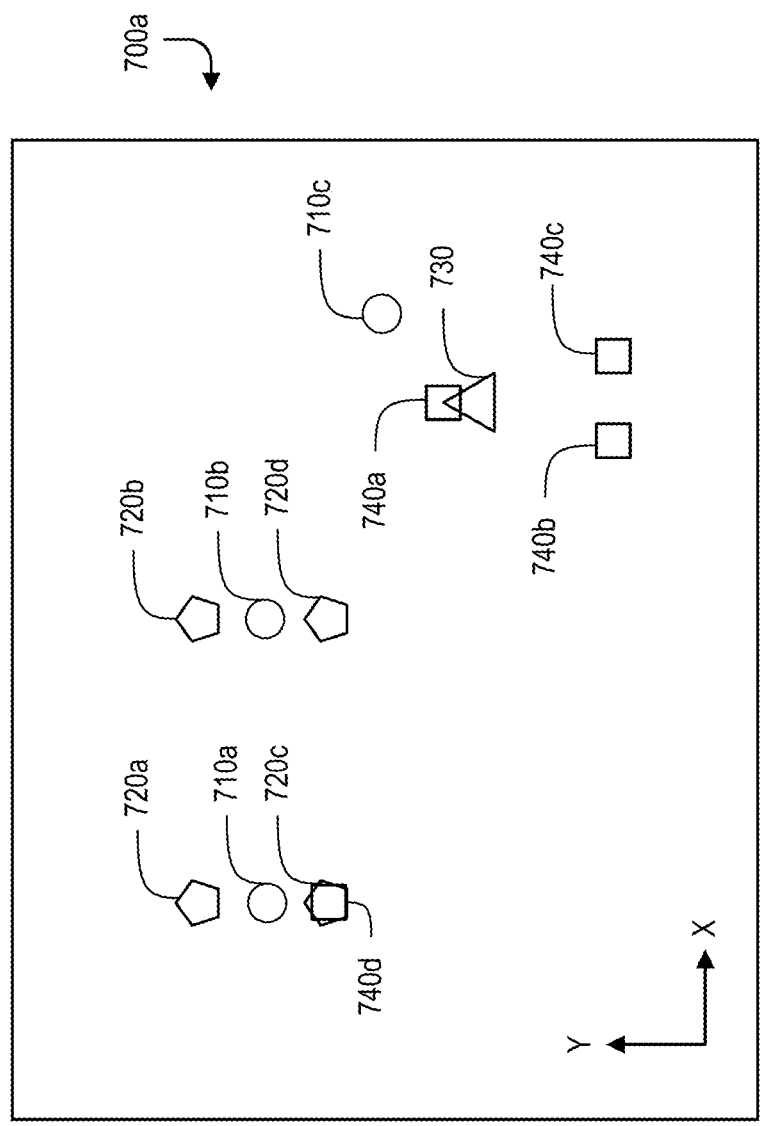
FIG. 7A is an example of a first map, according to various arrangements.

The map generation circuit 260 can use the locations of the tags (by proxy, the locations of the assets on which the tags are attached) determined by the positioning circuit 258 to generate a first map of the facility 101. FIG. 7A is an example of the first map 700a, according to various arrangements. Although the first map 700a is shown to be 2D and defined by two Cartesian axes X and Y for the sake of clarity, the first map can also be a 3D map defined by three Cartesian axes X, Y, and Z. The first map 700a can include base station locations 710a, 710b, and 710c of the base stations (e.g., the base stations 110a, 110b, and 110c). The base station locations 710a, 710b, and 710c can be predetermined according to installation layout, and each can be defined by a set of coordinates. Each base station can determine the distance between itself and each of the tags in the facility and send the distance to the server 150. The positioning circuit 258 can determine the location (as defined by a set of coordinates) of each of the tags and identify the asset associated with the tag (e.g., using the mapping table 400) and convey the same to the map generation circuit 260.

For example, the stationary locations 720a, 720b, 720c, and 720d are the determined locations of the tags 125 (e.g., the tags 640a, 640b, 640c, and 640d) provided on stationary assets 120 such as racks (e.g., the rack 602) and storage spaces (e.g., the storage spaces 604a, 604b, 604c, and 604d). The semi-dynamic locations 740a, 740b, 740c, and 740d are determined locations of the tags 145 (e.g., the tags 625a, 625b, 625c, 635a, 635b, and 635c) provided on semi-dynamic assets 140 such as support platforms (e.g., the support platforms 630a, 630b, and 630c) or containers or boxes (e.g., the boxes 620a, 620b, and 620c). The dynamic asset location 730 is the determined location of the tag 135 provided on dynamic assets 130 such as (forklifts, UAV, UGV, or automated unmanned forklifts).

Figure 7B:
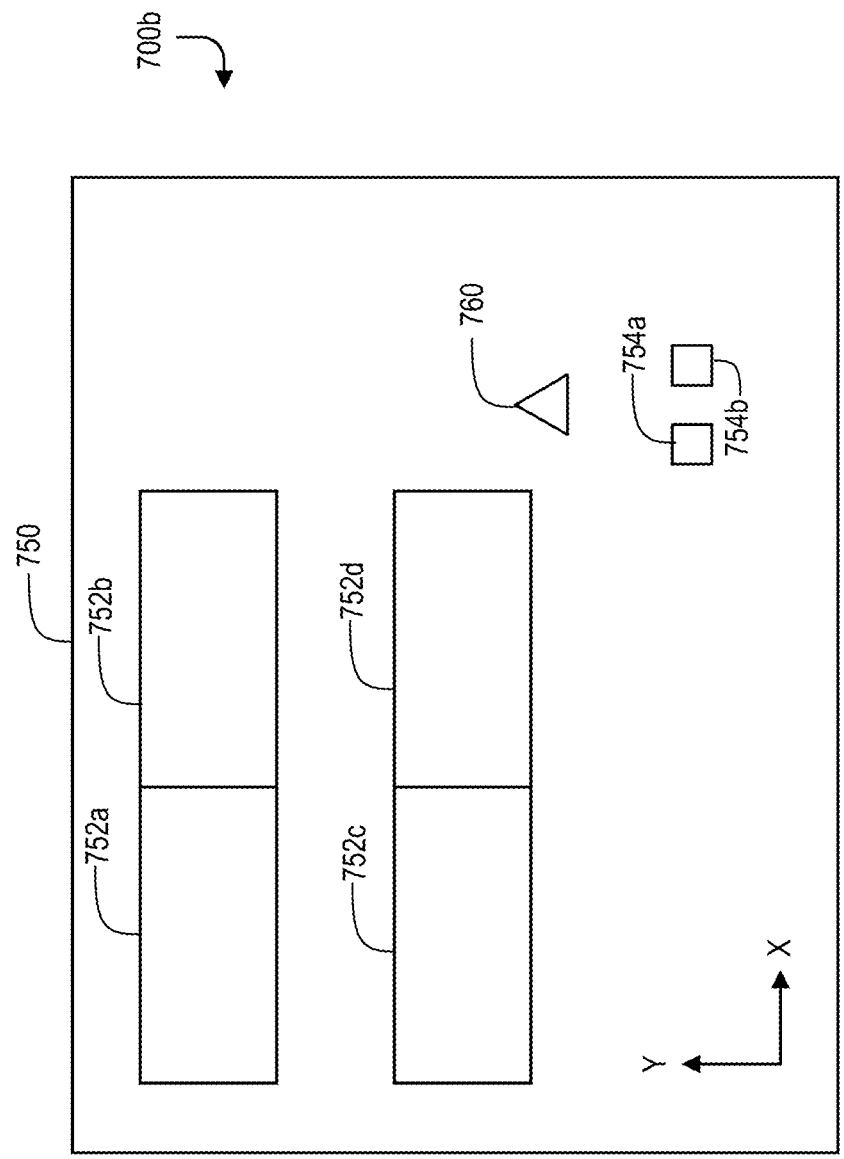
FIG. 7B is an example of a second map, according to various arrangements.

FIG. 7B is an example of the second map 700b, according to various arrangements. The second map 700b can be a representation of a SLAM map generated by an autonomous vehicle such as a UAV, UGV, autonomous forklift, robot, and so on. The SLAM map can aid the autonomous vehicle in moving around the facility 101 and perform tasks such as loading, unloading, retrieving, and placing support platforms and containers/boxes. For example, an Artificial Intelligence (AI) driver may control the autonomous vehicle to move to a certain location defined by set of coordinates in the second map 700b and perform certain tasks using computer vision, e.g., retrieve a certain support platform or container/box based on output of camera and other sensors. For example, the autonomous vehicle, which can be a dynamic asset 130, can detect boundary/wall 750 and objects 752a, 752b, 752c, 752d, 754a and 754b using Light Detection and Ranging (LiDAR), laser range finder, Laser Distance Sensor (LDS), at least one camera (e.g., at least one range camera, depth camera, or so on), ultrasonic radar sensor, infrared and photocell sensors, and other ranging devices. However, the autonomous vehicle cannot distinguish the identity of these objects 750, 752a, 752b, 752c, 752d, 754a and 754b. Although the outlines of the boundary/wall 750 and objects 752a, 752b, 752c, 752d, 754a and 754b appear to be crisp, straight, and continuous for the sake of clarity, any outline of an object SLAM map may appear fuzz or may appear as dots. Although the second map 700b is shown to be 2D and defined by two Cartesian axes X and Y for the sake of clarity, the first map can also be a 3D map defined by three Cartesian axes X, Y, and Z.

FIG. 7C is an example of the third map 700c, according to various arrangements. The third map 700c can be a design map that shows the layout of the facility 101, an example of which is a CAD drawing in a file such as DWG, RFA, DXF, PLN, DGN, and so on. The third map 700c is a design map that is suitably clear for a human operator to view. The third map 700c includes boundary/wall 770 and objects 772a, 772b, 772c, and 772d. The objects 772a, 772b, 772c, and 772d are stationary assets 120. Given that the third map 700c may be designed by a human operator, only stationary assets 120 and not any of the semi-dynamic assets 140 or the dynamic assets 130 are shown in the third map 700c. Although the third map 700c is shown to be 2D and defined by two Cartesian axes X and Y for the sake of clarity, the first map can also be a 3D map defined by three Cartesian axes X, Y, and Z.

In some arrangements, the information in the first map 700a can be used to update the second map 700b and the third map 700c. For example, the identity and position information determined for the first map 700a can be used to assist with obstacle avoidance and pathing by an autonomous vehicle with respect to certain objects that may be outside of the detection range of the sensors on the autonomous vehicle. The identity and position information determined for the first map 700a can be used to update the third map 700c which can be rendered to be displayed to a human operator to provide knowledge of the real-time locations of semi-dynamic assets 140 and dynamic assets 130.

The maps 700a, 700b, and 700c can be aligned by resizing and reorienting one or more of the maps 700a, 700b, and 700c to determine at least one of a transformation matrix or a rotational matrix that can translate a location (defined using first coordinates) on one of the maps 700a, 700b, and 700c to a location (defined using second coordinates) on another one of the maps 700a, 700b, and 700c.

Figure 8:
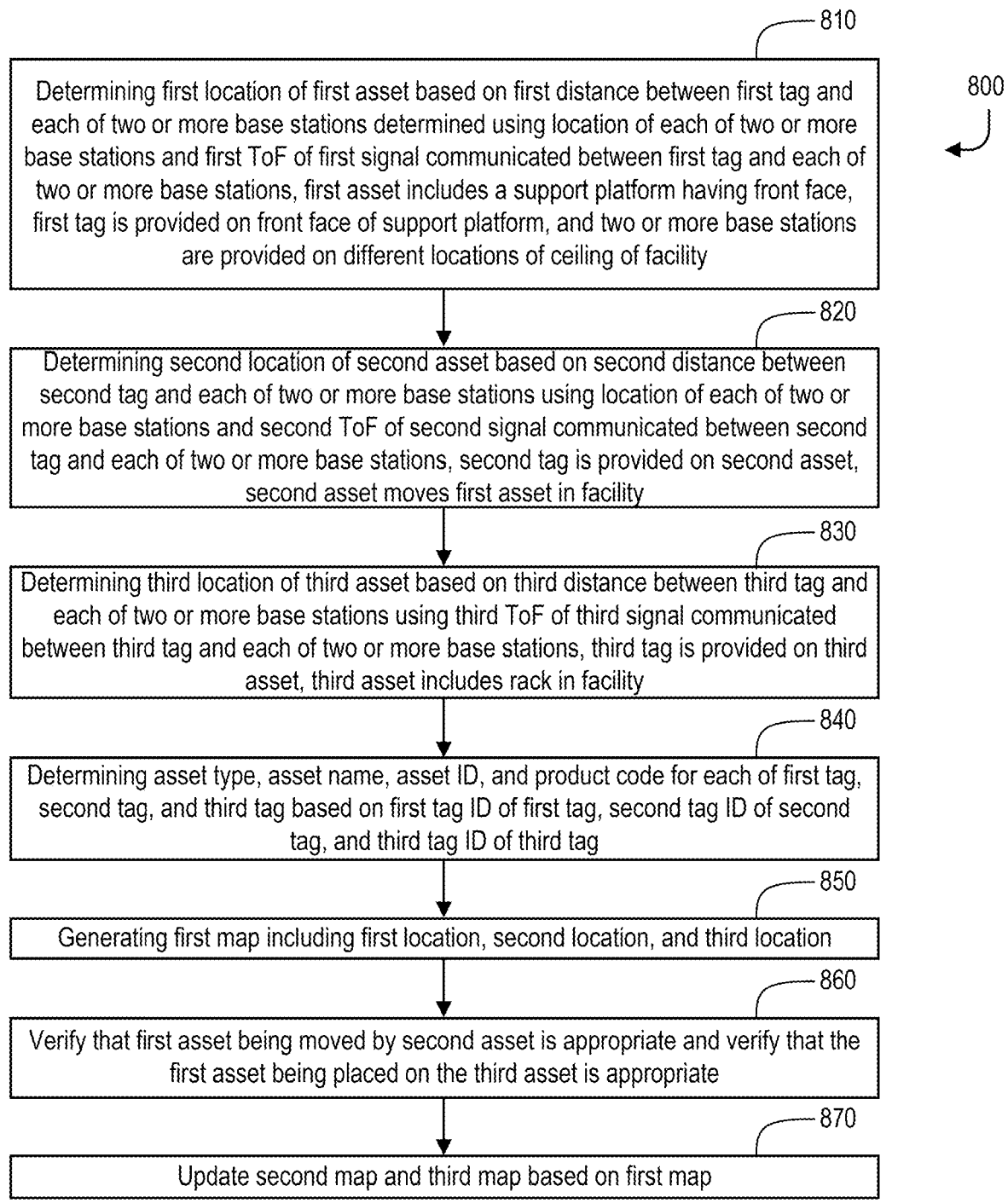
FIG. 8 is a method for managing location information of assets in a facility, according to various arrangements.

FIG. 8 is a method 800 for managing location information of assets in a facility, according to various arrangements. Referring to FIGS. 1-8, the method 800 can be performed using the systems 100 and 200.

At 810, the server 150 (e.g., the positioning circuit 258) determines a first location (e.g., the locations 740a, 740b, 740c, 740d) of a first asset (e.g., the semi-dynamic asset 140, the support platform 500, the support platforms 630a, 630b, or 630c) based on a first distance between a first tag (e.g., the tag 145 or 210) and each of two or more base stations (e.g., 110a, 110b, 110c, 650) determined using a location of each of the two or more base stations and first ToF of a first signal communicated between the first tag and each of the two or more base stations. The first asset includes a support platform (e.g., the support platform 500, the support platforms 630a, 630b, or 630c) having a front face (e.g., the front face 520). The first tag is provided on the front face of the support platform. The two or more base stations are provided on different locations of a ceiling of the facility 101. In some examples, the first asset can be a box or another container such as the boxes 620a, 620b, and 620c, and the first tag can be the tags 625a, 625b, or 625c.

At 820, the server 150 (e.g., the positioning circuit 258) determines a second location (e.g., the location 730) of a second asset (e.g., the dynamic asset 130) based on a second distance between a second tag (e.g., the tag 135 or 210) and each of the two or more base stations (e.g., 110a, 110b, 110c, 650) using the location of each of the two or more base stations and second ToF of a second signal communicated between the second tag and each of the two or more base stations. The second tag is provided on the second asset. The second asset can be a vehicle such as a forklift driven by a human driver, a UAV, a UGV, an autonomous forklift, and so on that moves the first asset (e.g., the support platform) in the facility 101.

At 830, the server 150 (e.g., the positioning circuit 258) determines a third location (e.g., the locations 720a, 720b, 720c, and 720d) of a third asset (e.g., the stationary asset 120) based on a third distance between a third tag (e.g., the tag 125, 640a, 640b, 640c, or 640d) and each of the two or more base stations (e.g., 110a, 110b, 110c, 650) using third ToF of a third signal communicated between the third tag and each of the two or more base stations. The third tag is provided on or for the third asset, the third asset includes a rack (e.g., 602) or a storage space (e.g., 604a, 604b, 604c, or 604d) in the facility 101.

The first location, the second location, and the third location can be determined using trilateration as shown in FIG. 3, multilateration, triangulation, or so on, where the two or more base stations includes at least three base stations dispersed throughout the facility 101 (e.g., on or hanging from the ceiling of the facility 101) for improved LoS and ranging accuracy.

At 840, the server 150 (e.g., the positioning circuit 258) determines an asset type, asset name, asset ID, and product code for each of the first tag, the second tag, and the third tag based on a first tag ID of the first tag, a second tag ID of the second tag, and a third tag ID of the third tag. The positioning circuit 258 can determine the asset type, asset name, asset ID, and product code for a tag using a mapping table such as the mapping table 400. The signal indicating the tag ID can be added to the signal for ranging using modulation, for example. The first tag ID is received by the two or more base stations with or in the first signal, and the two or more base stations forwards the first tag ID to the server 150 via the network 205. The second tag ID is received by the two or more base stations with or in the second signal, and the two or more base stations forwards the second tag ID to the server 150 via the network 205. The third tag ID is received by the two or more base stations with or in the third signal, and the two or more base stations forwards the third tag ID to the server 150 via the network 205. In other examples, a separate signal containing the tag ID can be transmitted by the transmitter 222 of the tag to the receiver 244.

At 850, the server 150 (e.g., the map generation circuit 260) can generate a first map (e.g., the first map 700a) including the first location, the second location, and the third location. As shown in the first map 700a, graphical elements on the coordinates defining the first location, the second location, and the third location can be displayed in the first map 700a.

In some arrangements, the first distance, the second distance, and the third distance determined based on the ToFs as described herein can be referred to as absolute distances. In some examples, the distance between a stationary location and a dynamic location, or the distance between a stationary location and a semi-dynamic location can be referred to as a reference distance. The reference distance can be determined by determining the distance between a set of coordinates defining the stationary location and a set of coordinates defining the semi-dynamic or dynamic location. The stationary tag and the stationary position thereof has a known location, and can be used as a reference point for generating the first map or correcting/adjusting the locations of semi-dynamic assets 140 and dynamic assets 130.

The absolute distances may be inaccurate due to interference or lack of power. For instance, a semi-dynamic location of a semi-dynamic asset 140 may be shown in the first map (generated at map at 850) at a location corresponding to a corridor along which a forklift and personnel move, where the physical location of the semi-dynamic asset 140 is on a rack. The reference distance can be used to correct the semi-dynamic location of the semi-dynamic asset 140 in this case. For example, in response to the positioning circuit 258 determining that a reference distance between a semi-dynamic location and each of the stationary location exceeds a predetermined threshold (e.g., 1 m, 2 m, 5 m, or so on) for over a predetermined period of time (e.g., 10 seconds), the positioning circuit 258 can determine that the semi-dynamic location is erroneous, and adjusts the semi-dynamic location based on a closest stationary location. For example, the positioning circuit 258 can change the semi-dynamic location to be the same as the stationary location associated with the shortest reference distance among the reference distances of all stationary locations. Dynamic locations can be corrected in the same manner. Such correction can conserve hardware resources and improves positioning accuracy, for example, by effectively reducing the number of base stations needed to accurate positioning of semi-dynamic assets and dynamic assets 130.

At 860, the server 150 (e.g., the positioning circuit 258) can verify that the first asset being moved by the second asset is appropriate and verify that the first asset being placed on or adjacent on the third asset is appropriate. At 870, the server 150 (e.g., the map generation circuit 260) can update the second map (e.g., 700b) and the third map (700c) based on the first map.

In some arrangements, the method 800 can be performed during an initialization phase of the system 200. For example, during a power-up phase of the server 150, the base stations 110, and the tags 210, blocks 810-870 can be performed to obtain the initial first map, and/or the second and third maps can be updated. Upon generation of the first map, the semi-dynamic locations and the dynamic locations can be corrected based on the references distances in the manner described herein.

Figure 9:
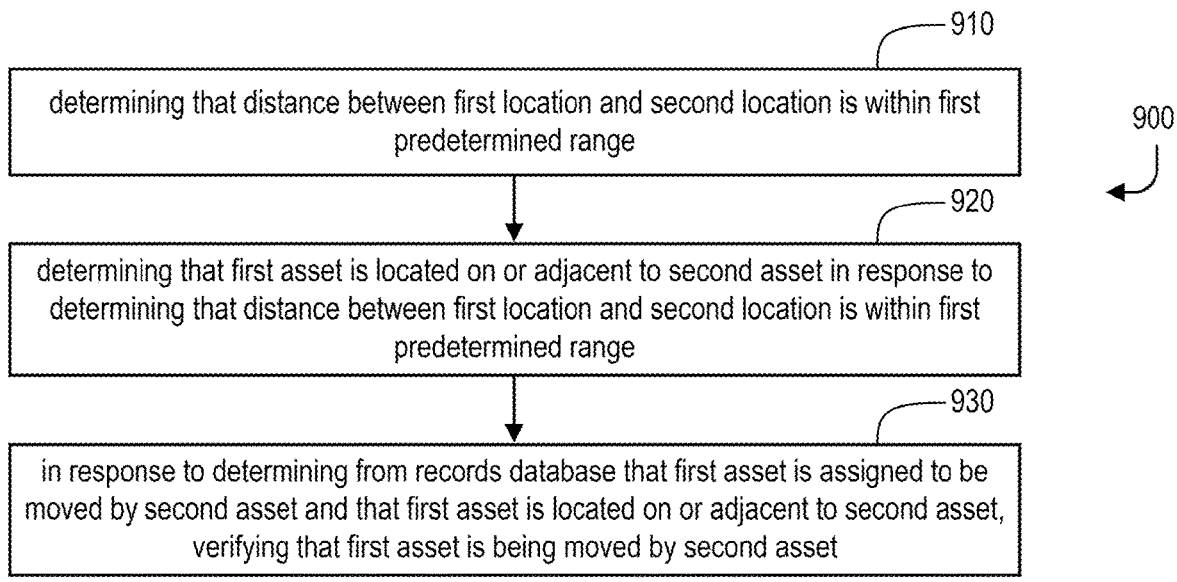
FIG. 9 is a method for verifying that the first asset being moved by the second asset is appropriate, according to various arrangements.

FIG. 9 is a method 900 for verifying that the first asset being moved by the second asset is appropriate, according to various arrangements. Referring to FIGS. 1-9, the method 900 can be performed using the systems 100 and 200. The method 900 is an example implementation of 860. At 910, the server 150 (e.g., the positioning circuit 258) determines that a distance between the first location and the second location is within a first predetermined range. At 920, the server 150 (e.g., the positioning circuit 258) determines that the first asset is located on or adjacent to the second asset in response to determining that the distance between the first location and the second location is within the first predetermined range. At 930, in response to determining from a records database that the first asset is assigned to be moved by the second asset and that the first asset is located on or adjacent to the second asset, the server 150 (e.g., the positioning circuit 258) verifies that the first asset being moved by the second asset is appropriate. In other words, the method 900 can verify whether the first asset (e.g., a semi-dynamic asset 140 such as a support platform or container/box) is being moved by the appropriate or assigned second asset which can be a vehicle (e.g., a forklift, UAV, UGV, autonomous forklift, or so on). The vehicle may be assigned by a warehouse management software platform, and the assignment information can be stored in the records database 268.

As shown in the first map 700a, the dynamic location 730 corresponding to a forklift (a forklift ID identified using the tag ID and a mapping table) and the semi-dynamic location 740a corresponding to a support platform (e.g., a pallet ID identified using the tag ID and the mapping table) are adjacent to one another. The forklift can also be an UAV, UGV, or autonomous forklift. In some examples, the positioning circuit 258 can determine that a distance between the semi-dynamic location 740a and the dynamic location 730 is within a predetermined range (e.g., 5 cm, 10 cm, 20 cm, 40 cm, 50 cm, 1 m) using the coordinates defining the semi-dynamic location 740a and the coordinates defining the dynamic location 730. In response, the positioning circuit 258 can determine that the support platform (asset corresponding to the semi-dynamic location 740a) is located on or adjacent to the forklift (asset corresponding to the dynamic location 730). The positioning circuit 258 can confirm that the support platform is being moved by the assigned or designated forklift by retrieving assignment records from the records database 268. The assignment records may indicate that a support platform with the pallet ID is assigned to the forklift with the forklift ID. In response to determining from the records database that the support platform is assigned to be moved by the forklift, and that the support platform is currently located on or adjacent to the forklift, the positioning circuit 258 can verify that the support platform is being moved by the appropriate forklift. In some examples, the positioning circuit 258 can further verify that the forklift and the support platform are moving together by determining that the dynamic location 730 and the semi-dynamic location 740a are both changing over a time interval (e.g., the previous 3 seconds, 5 seconds 10 seconds) while being within the predetermined range. In response to determining from the records database that the support platform is not assigned to be moved by the forklift, or that the support platform is not currently located on or adjacent to the forklift, moving of the support platform by the forklift is not authorized or appropriate. The positioning circuit 258 can send a notification to the forklift to request the human driver to move the support platform to the loading area and retrieve the appropriate support platform or send a notification and instructions to autonomous driver of a UAV, UGV, or automated self-driving forklift to move the support platform to the loading area and retrieve the appropriate support platform. For example, the autonomous driver of a UAV, UGV, or automated self-driving forklift can move the support platform to another rack or a loading area, or retrieve another support platform from the loading area. In some examples, in response to the positioning circuit 258 determining that the forklift and the support platform are moving together, the positioning circuit 258, the positioning circuit 258 can update the mapping table (e.g., the mapping table 400) to populate the product code field for the forklift with the product codes of the pallet (e.g., SKU-A and SKU-B).

Figure 10:
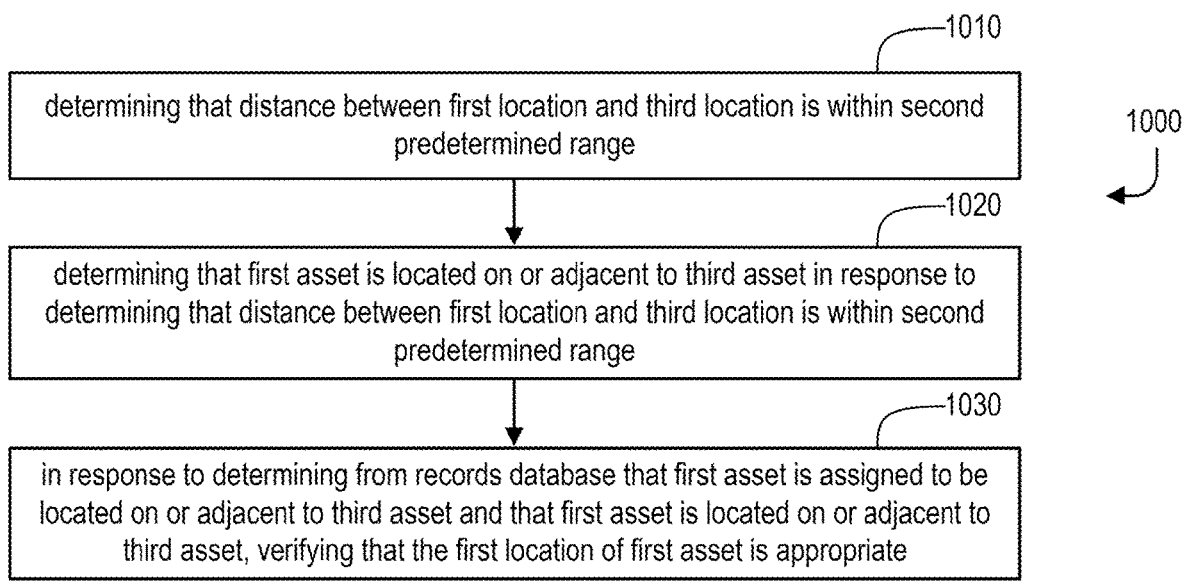
FIG. 10 is a method for verifying that the first asset being placed on or adjacent to the third asset is appropriate, according to various arrangements.

FIG. 10 is a method 1000 for verifying that the first asset being placed on or adjacent to the third asset is appropriate, according to various arrangements. Referring to FIGS. 1-10, the method 1000 can be performed using the systems 100 and 200. The method 1000 is an example implementation of 860. At 1010, the server 150 (e.g., the positioning circuit 258) determines that a distance between the first location and the third location is within a second predetermined range. At 1020, the server 150 (e.g., the positioning circuit 258) determines that the first asset is located on or adjacent to the third asset in response to determining that the distance between the first location and the third location is within the first predetermined range. At 1030, in response to determining from the records database that the first asset is assigned to be located on or adjacent to (e.g., stored by) the third asset and that the first asset is located on or adjacent to the third asset, the server 150 (e.g., the positioning circuit 258) verifies that the first location of the first asset is appropriate. In other words, the method 1000 can verify whether the first asset (e.g., a semi-dynamic asset 140 such as a support platform or container/box) is being placed on the appropriate or assigned rack or storage space. The rack or storage space may be assigned by a warehouse management software platform, and the assignment information can be stored in the records database 268.

As shown in the first map 700a, the stationary location 720c corresponding to a rack (a rack ID identified using the tag ID and a mapping table) and the semi-dynamic location 740d corresponding to a support platform (e.g., a pallet ID identified using the tag ID and the mapping table) are adjacent to one another. In some examples, the positioning circuit 258 can determine that a distance between the semi-dynamic location 740d and the stationary location 720c is within a predetermined range (e.g., 10 cm, 20 cm, 40 cm, 50 cm, 1 m) using the coordinates defining the semi-dynamic location 740d and the coordinates defining the stationary location 720c. In response, the positioning circuit 258 can determine that the support platform (asset corresponding to the semi-dynamic location 740d) is located on or adjacent to the rack (asset corresponding to the stationary location 720c). The positioning circuit 258 can confirm that the support platform is on the assigned or designated rack by retrieving assignment records from the records database 268. The assignment records may indicate that a support platform with the pallet ID is assigned to the rack with the rack ID. In response to determining from the records database that the support platform is assigned to be located on, adjacent to, or stored on the rack, and that the support platform is currently located on or adjacent to the rack, the appropriate storage location is verified. On the other hand, in response to determining from the records database that the support platform is not assigned to be located on, adjacent to, or stored on the rack, or that the support platform is not currently located on or adjacent to the rack, the storage location is determined to be inappropriate. The positioning circuit 258 can send a notification to the forklift to request the human driver to move the support platform to the appropriate location or send a notification and instructions to autonomous driver of a UAV, UGV, or automated self-driving forklift to move the support platform to the appropriate location. For example, the autonomous driver of a UAV, UGV, or automated self-driving forklift can remove the support platform from the rack, move the support platform to another rack or a loading area, or move another support platform to the rack. In some examples, in response to the positioning circuit 258 determining that the support platform is appropriately placed on the rack, the positioning circuit 258, the positioning circuit 258 can update the mapping table (e.g., the mapping table 400) to populate the product code field for the rack with the product codes of the pallet (e.g., SKU-A and SKU-B) and remove the product codes from the product code field of the pallet.

Due to human errors or errors in computer vision and other AI visual recognition, products, pallets, boxes, containers may be picked up by the wrong vehicle or may be placed in the wrong storage space or rack. Accordingly, the methods 900 and 1000 can improve accuracy of product storage placement by autonomous or human operated vehicles that move the products to designated locations.

FIG. 11A is an example of a first map 1100a, according to various arrangements. FIG. 11B is an example of a second map 1100b, according to various arrangements. FIG. 11C is an example of a third map 1100c, according to various arrangements. The first map 1100a can be a map generated according to blocks 810-850, in some examples, similar to the first map 700a. The second map 1100b can be a representation of a SLAM map generated by an autonomous vehicle such as a UAV, UGV, autonomous forklift, robot, and so on, similar to the second map 700b. The third map 1100c can be a design map that shows the layout of the facility 101, an example of which is a CAD drawing in a file such as DWG, RFA, DXF, PLN, DGN, and so on, similar to the third map 700c. Information determined for the first map 1100a can be used to update the second map 1100b and the third map 1100c, for example, at block 870. For example, the map generation circuit 260 can translate coordinates defining the first location in the first map 1100a to coordinates defining a first location on the second map 1100b and translate coordinates defining the second location in the first map 1100a to coordinates defining a second location on the second map 1100b. For example, the map generation circuit 260 can translate the coordinates defining the first location in the first map 1100a to coordinates defining a first location on the third map 1100c and translate the coordinates defining the second location in the first map 1100a to coordinates defining a second location on the third map 1100c.

In some examples, the positioning circuit 258 can determine the location 1110 of a semi-dynamic asset 140 (e.g., a support platform, a container, or a box) or a dynamic asset (e.g., a first vehicle or personnel). The location 1110 can be determined using trilateration as shown in FIG. 3, multilateration, triangulation, or so one. The identity of the asset can be determined using a mapping table such as the mapping table 400, based on the tag ID on the asset.

The map generation circuit 260 can translate the location 1110 (e.g., first coordinates defining the same) in the first map 1100a using a first transformation matrix and/or a first rotational matrix into the location 1140 (e.g., second coordinates defining the same) in the second map 1100b and update the second map 1100b to include the location 1140. The second map 1100b may be used by a second vehicle (e.g., a UAV, UGV, autonomous forklift, robot, and so on) to navigate within the facility 101. This allows the second vehicle to become aware of potential obstacles that may not be presently detected by the second vehicle as the obstacle is beyond the detection ranges of the sensors of the second vehicle. In some examples, one or more of the asset type, asset name, asset ID, or product code mapped to the tag ID of the asset having the location 1110 can be transmitted to the AI driver of the second vehicle, so that the AI driver can employ suitable strategies based on the size and movement of the asset type, asset name, asset ID, or product code. For example, the AI driver of the second vehicle may choose to avoid the asset having the location 1140 in response to determining that the asset type is pallet, box, or personnel, and may choose to disregard the asset having the location 1140 in response to determining that the asset type is forklift as the forklift is likely to be out of the path of the second vehicle when the second vehicle reaches the location 1140.

The map generation circuit 260 can translate the location 1110 (e.g., first coordinates defining the same) in the first map 1100a using a second transformation matrix and/or a second rotational matrix into the location 1160 (e.g., third coordinates defining the same) in the third map 1100c and update the third map 1100c to include the location 1160. The third map 1100c may be rendered for an operator to monitor the real-time locations of assets around the facility 101. This allows the operator to become aware of dynamic assets 130 and semi-dynamic assets 140 that may not be present in the original third map 1100c. In some examples, one or more of the asset type, asset name, asset ID, or product code mapped to the tag ID of the asset having the location 1110 can be used select a display element to be displayed at the third map 1100c. For example, a display element that appears to be a pallet can be displayed for the asset name of pallet, a display element that appears to be a forklift can be displayed for the asset name of forklift, and so on. Accordingly, the third map can be displayed on a suitable display device connected to or included in the server 150. In the third map, a first display element selected corresponding to at least one of an asset type, asset name, asset ID, or product code associated with the first tag is displayed on the first location on the third map. In the third map, a second display element selected corresponding to at least one of an asset type, asset name, asset ID, or product code associated with the second tag is displayed on the second location on the third map.

In some examples, the positioning circuit 258 can determine the locations 1120a, 1120b, 1120c, and 1120d of semi-dynamic assets 140, e.g., semi-dynamic reference points, temporary reference points, or beacons such as cones, flags, stands, poles, stickers, and so on. The locations 1120a, 1120b, 1120c, and 1120d can be determined using trilateration as shown in FIG. 3, multilateration, triangulation, or so one. The identity of the beacon assets can be determined using a mapping table such as the mapping table 400, based on the tag IDs on the beacon assets. The map generation circuit 260 can define a zone 1130 with a utility corresponding to the asset name (e.g., loading area, unloading area, danger area, and so on). The utility can also be indicated using the asset ID.

The map generation circuit 260 can translate the locations 1120a, 1120b, 1120c, and 1120d or the zone 1130 (e.g., first coordinates defining the same) in the first map 1100a using a first transformation matrix and/or a first rotational matrix into the locations or the zone 1150 (e.g., second coordinates defining the same) in the second map 1100b and update the second map 1100b to include the locations or the zone 1150. In response to determining that the zone 1150 has a utility of loading area, the AI driver of a UAV, UGV, or autonomous forklift can be directed to move support platforms or containers/boxes retrieved from the racks to the zone 1150. In response to determining that the zone 1150 has a utility of unloading area, the AI driver of a UAV, UGV, or autonomous forklift can be directed to move support platforms or containers/boxes from the zone 1150 to the racks. In response to determining that the zone 1150 has a utility of danger area, the AI driver of a UAV, UGV, or autonomous forklift can be directed to avoid the zone 1150 in pathing. This allows an autonomous vehicle become aware of areas with utility that may not be presently detected by the autonomous vehicle as the areas are beyond the detection ranges of the sensors of the autonomous vehicle.

The map generation circuit 260 can translate the locations 1120a, 1120b, 1120c, and 1120d or the zone 1130 (e.g., first coordinates defining the same) in the first map 1100a using a second transformation matrix and/or a second rotational matrix into the locations or the zone 1170 (e.g., third coordinates defining the same) in the third map 1100c and update the third map 1100c to include the locations or the zone 1170. The third map 1100c may be rendered for an operator to monitor the real-time locations of assets around the facility 101. This allows the operator to become aware of zones defined ad hoc by personnel that may not be present in the original third map 1100c. In some examples, one or more of the asset type, asset name, asset ID, or product code mapped to the tag ID of the beacon assets having the locations 1120a, 1120b, 1120c, and 1120d can be used select a display element to be displayed at the third map 1100c. For example, a display element that represents loading, unloading, or danger can be displayed on, in, or adjacent to the zone 1170 according to the utility (loading area, unloading area, or danger area, respectively) associated with the tag in the asset name or asset ID.

In some examples, a dynamic asset 130 may include a base station 110 provided thereon for determining the location of other assets. For example, a forklift, UAV, UGV, or autonomous forklift may include a base station 110 (e.g., the ranging circuit 240, including the transmitter 242 and the receiver 244) in addition to the tag 135. The base station 110 can be loaded on a roof of the forklift for improved ranging accuracy and unobstructed LoS. The tag 135 on the dynamic asset 130 can be used to communicate ranging signals with two or more other base stations (e.g., three other base stations) to determine the location of the dynamic asset 130 in the manner described (e.g., the method 300). Thus, although the dynamic asset 130 has a moving location, the location of the dynamic asset 130 is known such that the baes station 110 on the dynamic asset 130 can communicate with tags on other assets to determine the locations of the other assets. Assume in the method 300 that the base station 110b is provided on a dynamic asset 130 that is moving. The location of the tag 300 can be likewise determined based on the static locations of the base stations 110a, 110c, the distances 310a, 310c, along with the detected distance 310b and the location of the base station 110b when the distance 310b is determined. In some examples, one or both of the base stations 110a and 110c may also be located on dynamic assets 130. This allows the ranging accuracy to be improved, as the moving dynamic asset 130 can communicate with certain tags located remote from the stationary base stations. In some examples, the dynamic asset 130 with the base station 110 provided thereon can assist with ranging in the manner described during loading and unloading operations. In some examples, the dynamic asset 130 may be an autonomous vehicle that can be controlled by an AI driver that patrols a predetermined path within the facility 101 at a predetermined time (e.g., 5 AM, 9 PM, or off-work hours) to provide supplemental ranging using the method 300. In some examples, instead of continuously moving, the dynamic asset 130 with the base station 110 thereon can stop periodically (e.g., every 5 s, 10 s, 15 s, 30 s, 1 m) or at incremental distances (e.g., every 1 m, 2 m, 5 m, or so on) for a time interval (e.g., 5 s, 10 s, 15 s, 30 s, 1 m) to communicate ranging signals while the dynamic asset 130 is stopped or stationary, and stop performing ranging functions while the dynamic asset 130 is moving.

In some examples, the first map, the second map, and the third map can be overlaid. In some examples, the first map can be superimposed on the second map and/or the third map. In some examples, the stationary locations can be translated into the coordinates of the second map and/or the third map, and can be superimposed or added to the second map and/or the third map. In some examples, the features of the first map, the second map, and the third map can be superimposed on each other to generate one combined map, including the static locations, the dynamic locations, and the semi-dynamic locations in the manner described herein.

In some arrangements, the zone 1130 is a first zone that designates a restricted area in which a forklift, UAV, UGV, or autonomous vehicle cannot enter or operate, in the manner described. A second zone defined in a manner similar to the zone 1130 designates an authorized area in which the forklift, UAV, UGV, or autonomous vehicle can enter or operate. In some arrangements, the positioning circuit 258 can determine that a position of a first semi-dynamic asset (e.g., a first pallet) is within the first zone and that a position of a second semi-dynamic asset (e.g., a second pallet) is within the second zone, based on the coordinates defining the positions of the first semi-dynamic pallet, the first zone, and the second semi-dynamic pallet, the second zone. In some examples, the positioning circuit 258 can send a message to the forklift, UAV, UGV, or autonomous vehicle with a position of the second semi-dynamic asset based on the authorization, as the forklift, UAV, UGV, or autonomous vehicle is not allowed in the first zone. The position of the second semi-dynamic asset can be translated into coordinates in the second MAP that is consumed by the forklift, UAV, UGV, or autonomous vehicle.

In some arrangements, the server 150 includes an ML model 270 configured to generate instructions for scheduling, moving, operating, and managing the operations, tasks, and movements of dynamic assets 130. As described herein, the dynamic assets 130 can include autonomous vehicles or robotic systems (e.g., autonomous forklifts, autonomous trucks, UAVs, UGVs, and so on) that perform tasks such as moving within the facility 101 and moving a semi-dynamic asset 140 (e.g., loading, unloading, storing, retrieving, and so on). The ML model 270 can automatically generate instructions for a dynamic asset 130 that controls the dynamic asset to move within the facility 101 and move a semi-dynamic asset 140, to realize autonomous, AI-based provision of real-time instructions.

Conventional warehouse operations, such as loading and unloading goods, rely on human instructions, backend control of unmanned vehicles or robotic systems, and human operation of traditional user-operated vehicles. In other words, conventional warehouse solutions depend entirely or significantly on human perception and understanding of the locations, task list, and schedules of operations relating to the assets 120, 130, 140, aided in some instances by scheduling applications or sensors that are static and unintelligent. Thus, conventional warehouse solutions lack insights from aspects beyond human perception and understanding of the real-time locations, task list, and schedules relating to the assets 120, 130, 140.

Arrangements disclosed herein relate to a system including an ML model 270 that can convert natural language input (e.g., user input or human-inputted text) into a set of optimized machine instructions for a dynamic asset 130 to control the dynamic asset 130 to perform tasks such as moving, loading, unloading, storing, and retrieving semi-dynamic assets 140, based on real-time location data of the assets 120, 130, 140 as updated in the databases 264, 266, and 268. The ML model 270 can not only convert natural language input by a human operator into a set of machine instructions that can control or operate the dynamic assets 130, but can also optimize the machine instructions to improve the efficiency and safety of the operations of the dynamic assets 130 within the facility 101 based on feedback information, including the information stored and updated in the databases 264, 266, and 268. In some arrangements, the ML model 270 is trained or updated on real-time feedback including real-time positioning of the assets 120, 130, and 140 as detected using the systems 100 and 200 as described herein.

Figure 12:
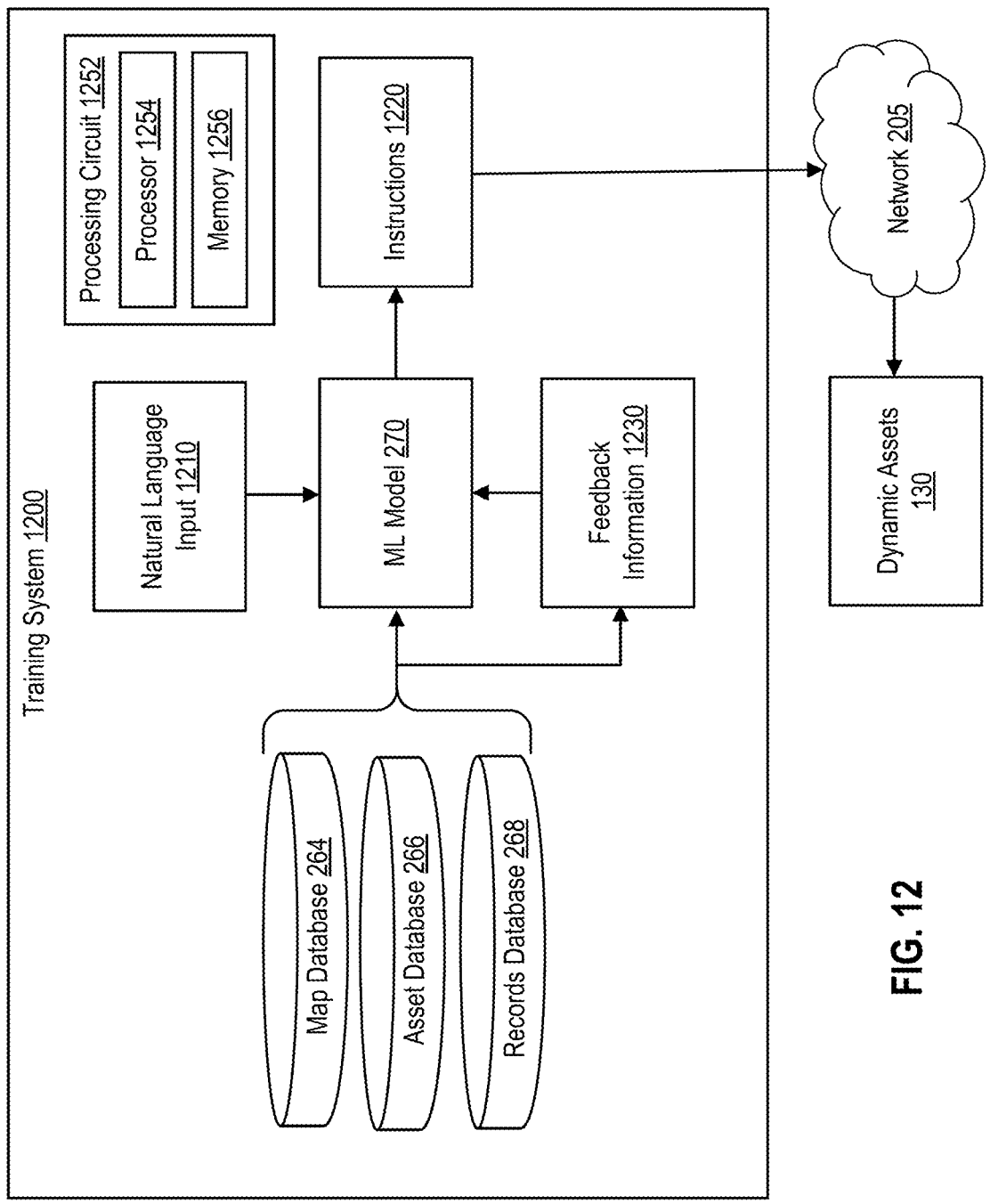
FIG. 12 is a schematic block diagram illustrating an example training system for training the ML model, according to various arrangements.

FIG. 12 is a schematic block diagram illustrating an example training system 1200 for training the ML model 270, according to various arrangements. The ML model 270 can be provided (e.g., transferred or downloaded) to the server 150 as software, firmware, or application, via a suitable network or physical connection or medium. In some examples, the training system 1200 or a portion thereof is included in the server 150 to receive real-time feedback information 1230 tailored specifically to the facility 101 and its assets 120, 130, 140. For example, the processing circuit 1252, the processor 1254, and the memory 1256 can be the same as the processing circuit 252, the processor 254, and the memory 256, respectively. Thus, in some examples, the ML model 270 can provide machine instructions to the dynamic assets 130 as the dynamic assets 130 perform daily operations within the facility 101. In other words, the ML model 270 can perform downstream tasks while being further updated (e.g., fine-tuned) for the downstream tasks.

The training system 1200 includes a processing circuit 1252 having at least one processor 1254 and at least one memory 1256. The processing circuit 1252 can be a processing circuit such as the processing circuit 252. The processor 1254 can be a processor such as the processor 254. The memory 1256 can be a memory such as the memory 256. The processing circuit 1252 is configured to perform the functions and operations of the training system 1200, as described herein. For example, the processing circuit 1252 can train or update the ML model 270 in the manner described herein.

In some arrangements, the natural language input 1210 and the information stored in the databases 264, 266, and 268 are applied as inputs to the ML model 270 to generate the instructions 1220 as output. The instructions 1220 are transmitted to the intended one or more dynamic assets 130 via the network 205. The dynamic assets 130 can each execute its respective instructions 1220 to perform tasks within the facility 101. The locations of the dynamic assets 130 executing the instructions 1220 and the locations of the semi-dynamic assets 140, which are included in the information updated in the databases 264, 266, and 268, can be used to determine the feedback information 1230. In some examples, the feedback information 1230 includes one or more metrics calculated using the real-time or current locations of the dynamic assets 130 and the semi-dynamic assets 140.

In some examples, the natural language input 1210 can be text input received from a user via an input/output device such as a mouse, keyboard, microphone, touchscreen, and so on. The input device can be coupled to the server 150, a user device of the user communicable coupled to the server 150 (e.g., via the network 205), and so on. The server 150 can relay the natural language input 1210 to the training system 1200 via the network 205.

Figure 13:
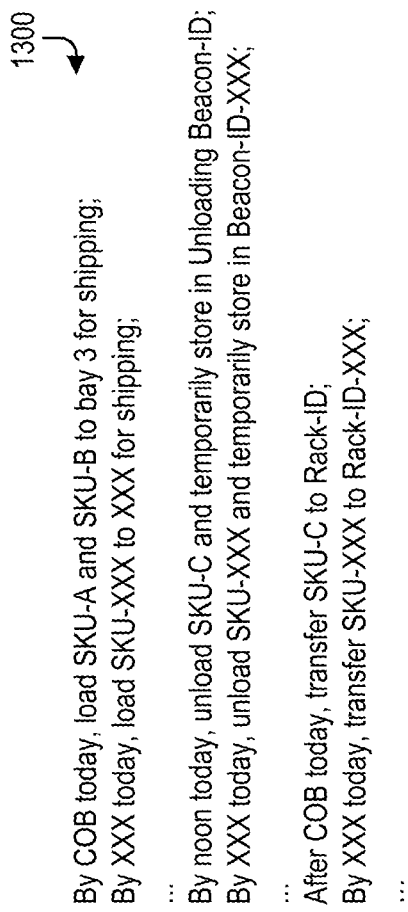
FIG. 13 is an example natural language input, according to various arrangements.

FIG. 13 is an example natural language input 1300, according to various arrangements. The natural language input 1300 is an example of the natural language input 1210. With respect to a task such as loading, a user may input, using the input device, a time by which the task needs to be completed (e.g., COB today or XXX today), the task type (e.g., load), the underlying asset (e.g., SKU-A, SKU-B, or SKU-XXX), a loading destination (e.g., bay 3 or XXX), and so on. With respect to a task such as unloading, a user may input, using the input device, a time by which the task needs to be completed (e.g., COB today, or XXX today), the task type (e.g., unload or store), the underlying asset (e.g., SKU-C or SKU-XXX), a storing destination (e.g., Unloading Beacon-ID or Beacon-ID-XXX), and so on. With respect to a task such as transfer, a user may input, using the input device, a time by which the task needs to be completed (e.g., COB today or XXX today), the task type (e.g., transfer), the underlying asset (e.g., SKU-C or SKU-XXX), a storing destination (e.g., Rack-ID or Rack-ID-XXX), and so on.

In some examples, the ML model 270 is a text generative model that is configured to receive text prompts (e.g., the natural language input 1210) and the information stored in the databases 264, 266, and 268 (including locations of the assets 120, 130, and 140) and output the instructions 1220 which are also texts. Example of the ML model 270 include a Large Language Model (LLM), a Generative Pre-trained Transformer (GPT) model, and so on. In some examples, the ML model 270 can be implemented using one or more artificial neural networks such as Convolutional Neural Network (CNN), Deep Neural Network (DNN), multilayer perception, and so on.

Applicant recognizes that although LLM and GPT models are shown to be promising models for generating computer-readable codes such as Python, such models are conventionally tailored to downstream tasks by using only human trainers to evaluate the performance of models, e.g., whether the codes compile and the degree to which the code achieves its objective based on human judgement. The arrangements disclosed herein relate to mechanisms by which the ML model 270 can be trained using reinforced learning based on metrics determined using location data derived from the TOF sensors within the facility 101 in real time. The mechanisms by which such metrics can be created in real time not only allows the ML model 270 to update its instructions 1220 in real time, but also allow the ML model 270 to be trained for its downstream task in real time. Accordingly, the ML model 270 described herein can be provided to customers with minimal pre-training due to its flexibility in adapting to different layouts of facilities (e.g., warehouses) as the ML model 270 can be fine-tuned in real time as the dynamic assets 130.

As described herein, the map database 264 stores one or more of the first map, second map, and third map. The map generation circuit 260 can update in real time the maps stored in the map database 264 as the location of any of the tags 125, 135, 145 (210) change. In other words, the ML model 270 can obtain the locations of the assets 120, 130, and 140, the distances between two assets, and so on from the map database 264. In some arrangements, given that all of the first, second, and third maps contain information about the distance between two assets, the ML model 270 can use any one of the three maps, such as the first map which is used to update the two other maps, to determine the distance between two assets, based on which the feedback information 1230 (e.g., the metric) is determined.

In some arrangements, given that the first, second, and third maps have different map formats, these three types of maps are three different inputs into the ML model 270. Applicant recognizes that by providing two or more map types (e.g., two or more of the first, second, and third maps) to the ML model 270 for decision and training based on the feedback information 1230, the instructions 1220 can converge with the most efficient solution faster for all types of dynamic assets 130 and facility layouts. For example, given that the first map (e.g., the 2-D or 3-D map in Cartesian coordinates) have the most accurate distance information and the second map (e.g., the SLAM map) is used by the dynamic asset 130 for autonomous movement within the facility 101, providing both of those maps as input may allow the instructions 1220 (including coordinates in the second map for movement of the dynamic asset 130) to be more accurate and optimized. Accordingly, the input to the ML model 270 can include two of the first, second, and third maps or all of the first, second, and third maps.

As described herein, the asset database 266 stores information about the assets 120, 130, and 140, such as the mapping table 400. The ML Model 270 can leverage information stored in this asset database 266 to link the natural language input 1210 (which may include an asset name, asset ID, or product code as shown in the mapping table 400) to a particular tag ID, which corresponds to a certain location. In other words, by providing the information stored in the asset database 266 to the ML Model 270, the ML Model 270 can determine a tag ID corresponding to the natural language input 1210 and output the instructions 1220 based on the location of the tag ID as included in the map database 264.

As described herein, the records database 268 includes assignment information describing that a dynamic asset 130 (e.g., a vehicle) is assigned to move a semi-dynamic asset 140 (e.g., a pallet) and that a stationary asset 120 (e.g., a rack or storage space) is assigned to store a semi-dynamic asset 140. In this regard, the warehouse management software platform generates such assignments include the ML Model 270. That is, the ML Model 270 can assign a semi-dynamic asset 140 to be moved by a dynamic asset 130 and stored at a stationary asset 120 using the instructions 1220. The ML model 270 can leverage the information stored in the records database 268 to determine current allocation and assignment information of the dynamic assets 130 and the stationary assets 120 with respect to the semi-dynamic assets 140, to efficiently determine the availability of the dynamic assets 130 and the stationary assets 120 in real-time. The ML model 270 can update the records database 268 with the allocation and assignment information corresponding to the instructions 1220.

In some arrangements, the instructions 1220 for a dynamic asset 130 includes machine-readable instructions that can be processed and executed by a processing circuit of the dynamic asset 130. The processing circuit of a dynamic asset 130 includes a processor and a memory.

Examples of the instructions 1220 includes machine, processor, or computer-readable instructions such as C, C++, C#, MATLAB, Python, Pascal, Hardware Description Languages, Java, and so on.

In some arrangements, the instructions 1220 for a dynamic asset 130 to perform a task include a set of at least one location (e.g., a sequence of two or more locations) to which the dynamic asset 130 is to move, at least one operation to be performed at each location, at least one tag ID (e.g., those shown in FIG. 4) for the task (e.g., the tag ID of a semi-dynamic asset), and a priority level or task index identifying the order by which the instructions for this task are to be performed in view of instructions for at least one other task.

In some examples, for task of loading a semi-dynamic asset 140 (e.g., a pallet of goods) to a truck located at a given loading bay of the facility 101, the instructions corresponding to the task include a first location where the semi-dynamic asset 140 is stored (e.g., on a stationary asset 120 such as a rack) and a second location where the loading bay is located. The instruction can further specify operations to be performed by the dynamic asset 130 at the first location to be retrieving a semi-dynamic asset 140 identified by a first tag ID from a stationary asset 120 identified by a second tag ID. The instruction can further specify operations to be performed by the dynamic asset 130 at the second location to be unloading the semi-dynamic asset 140 identified by the first tag ID from the dynamic asset 130 at the second location, which can be a predefined location or a location defined to be within at least one of the zone 1130 in the map 1100a, the zone 1150 in the map 1100b, or the zone 1170 in the map 1100c.

In some examples, for task of unloading a semi-dynamic asset 140 (e.g., a pallet of goods) from a truck located at a given loading bay of the facility 101, the instructions corresponding to the task include a first location where the loading bay is located and a second location where the semi-dynamic asset 140 is to be stored (e.g., on a stationary asset 120 such as a rack). The instruction can further specify operations to be performed by the dynamic asset 130 at the first location to be loading the semi-dynamic asset 140 identified by the first tag ID to the dynamic asset 130 at the first location, which can be a predefined location or a location defined to be within at least one of the zone 1130 in the map 1100a, the zone 1150 in the map 1100b, or the zone 1170 in the map 1100c. The instruction can further specify operations to be performed by the dynamic asset 130 at the second location to be placing the semi-dynamic asset 140 identified by a first tag ID to a stationary asset 120 identified by a second tag ID.

In some examples, for task of relocating a semi-dynamic asset 140 (e.g., a pallet of goods), the instructions corresponding to the task include a first location where the semi-dynamic asset 140 is stored (e.g., on a stationary asset 120 such as a first rack) and a second location where the semi-dynamic asset 140 is to be stored (e.g., on a stationary asset 120 such as a second rack). The instruction can further specify operations to be performed by the dynamic asset 130 at the first location to be retrieving a semi-dynamic asset 140 identified by a first tag ID from a stationary asset 120 identified by a second tag ID. The instruction can further specify operations to be performed by the dynamic asset 130 at the second location to be placing the semi-dynamic asset 140 identified by the first tag ID on another stationary asset 120 identified by a third tag ID.

FIG. 14 is an example pseudocode instructions 1400 corresponding to an example of the instructions 1220, according to various arrangements. The pseudocode instructions 1400 can be an example output of the ML model 270 with the natural language input 1300 applied as input. For each task, the pseudocode instructions 1400 includes a set of instructions, e.g., Instruction Set A, Instruction Set B, Instruction Set C, and so on. The instruction sets shown in FIG. 14 are generated for and sent via the network 205 to a dynamic asset 130, referred to as Dynamic Asset A. Instructions for other dynamic assets can be generated accordingly.

For the task identified by "By COB today, load SKU-A and SKU-B to bay 3 for shipping;" Instruction Set A includes a priority level 1, which in some examples indicate that Instruction Set A is to be performed by Dynamic Asset A before other instruction sets are performed. Instruction Set A further includes a sequence of waypoints, identified by Location A and Location B. Location A, which can be defined by a set of coordinates in the second map (e.g., a SLAM map), is the location where the semi-dynamic asset 140 (Pallet-ID-A) is located. Instruction Set A indicates that the task to be performed at Location A includes retrieving from a rack identified by Rack-ID-A. Location B, which can be defined by a set of coordinates in the second map (e.g., a SLAM map), is the location where the semi-dynamic asset 140 (Pallet-ID-A) is to be unloaded. Instruction Set A indicates that the task to be performed at Location B includes unloading at Location B.

For the task identified by "By noon today, unload SKU-C and temporarily store in Unloading Beacon-ID;" Instruction Set B includes a priority level 10, which in some examples indicate that Instruction Set A is to be performed by Dynamic Asset A after other instruction sets with a lower priority value and before other instructions with a higher priority level. Instruction Set B further includes a sequence of waypoints, identified by Location B and Location C. Location B, which can be defined by a set of coordinates in the second map (e.g., a SLAM map), is the location where the semi-dynamic asset 140 (Pallet-ID-B) is located after being unloaded. Instruction Set B indicates that the task to be performed at Location B includes retrieving from Location B. Location C, which can be defined by a set of coordinates in the second map (e.g., a SLAM map), is the location where the semi-dynamic asset 140 (Pallet-ID-B) is to be stored. Instruction Set B indicates that the task to be performed at Location C includes placing to a rack identified by Rack-ID-B.

For the task identified by "After COB today, transfer SKU-C to Rack-ID;" Instruction Set C includes a priority level 20, which in some examples indicate that Instruction Set C is to be performed by Dynamic Asset A after other instruction sets with a lower priority value and before other instructions with a higher priority level. Instruction Set C further includes a sequence of waypoints, identified by Location D and Location E. Location D, which can be defined by a set of coordinates in the second map (e.g., a SLAM map), is the location where the semi-dynamic asset 140 (Pallet-ID-C) is located. Instruction Set C indicates that the task to be performed at Location D includes retrieving from a rack identified by Rack-ID-C. Location E, which can be defined by a set of coordinates in the second map (e.g., a SLAM map), is the location where the semi-dynamic asset 140 (Pallet-ID-A) is to be placed. Instruction Set C indicates that the task to be performed at Location D includes placing on a rack identified by Rack-ID-D.

FIG. 15 is a diagram illustrating assignment information stored in the records database 268 as updated by the instructions 1220 outputted by the ML model 270, according to various of arrangements. As shown in FIG. 15, as time goes on, the assignment information changes as the Dynamic Asset A is moving and transferring semi-dynamic assets. As shown, as Instruction Set A is executed by Dynamic Asset A, Pallet-ID-A is first assigned to (stored on) Rack-ID-A, then assigned to (moved by) Dynamic Asset A, then assigned to (unloaded to) Location B (Bay 3). As Instruction Set B is executed by Dynamic Asset A, Pallet-ID-B is first assigned to (unloaded to) Location B (Bay 3), then assigned to (moved by) Dynamic Asset A, then assigned to (stored on) Rack-ID-B. As Instruction Set C is executed by Dynamic Asset A, Pallet-ID-C is first assigned to (stored on) Rack-ID-C, then assigned to (moved by) Dynamic Asset A, then assigned to (stored on) Rack-ID-C. As described, the records database 268 can be continuously or periodically updated by the instructions 1220 to reflect current assignment information of the assets within the facility, and the ML model 270 can consume the records database 268 to determine availability and occupancy of the assets.

In some arrangements, the instructions 1220 can be performed by each respective dynamic asset 130 to move the semi-dynamic assets 140. The current locations of the stationary assets 120, the dynamic assets 130, and the semi-dynamic assets 140 can be determined by the base stations 110a, 110b, and 110c using the tags 125, 135, and 145 as described herein. The location information can be determined by the server 150 as described herein, and updated in real-time to the first, second, and third maps in the map database 164. The distances between two assets as determined in one or more of the first, second, and third maps in the map database 264 can be used to determine the instructions 1220 (e.g., the metric).

In some arrangements, the metric can include at least one of or a combination/aggregate of a plurality of metrics, such as an instruction set metric, a dynamic asset metric, an efficiency metric, an assignment verification metric, a time-to-completion metric, an idle-time metric, and so on.

In some arrangements, the instruction set metric $M_i$ for a given instruction set with index i can be defined based on a distance between the location of the dynamic asset 130 and the location/waypoint in the instruction set at the end of executing the entire instruction set or executing a corresponding waypoint. For Instruction Set A in FIG. 14, for waypoint 1, $M_i$ can equal to the distance between the current location of the dynamic asset 130 and Location A, the distance between the current location of the dynamic asset 130 and the current location of Pallet-ID-A, or the distance between the current location of the dynamic asset 130 and the current location of Rack-ID-A when waypoint 1 is successful completed. For waypoint 2 or the entire Instruction Set A, $M_i$ can equal to the distance between the current location of the dynamic asset 130 and Location B or the distance between the current location of the dynamic asset 130 and the current location of Pallet-ID-A when waypoint 2 or the entire Instruction Set A is executed. Execution of each way point and the entire instruction set can be determined based on an execution message received from the dynamic asset 130. In such examples, a lower $M_i$ indicates a more favorable or positive performance.

In some arrangements, the dynamic asset metric $M_{DA}$ for a given dynamic asset 130 can be defined based on a combination/aggregate of instruction set metrics $M_i$ for multiple instruction sets sent to the dynamic asset 130 within a predetermined time period (e.g., 1 hour, 3 hours, 24 hours, and so on). For example, the dynamic asset metric $M_{DA}$ for a dynamic asset 130 can be determined using expression (1):

$$M_{DA} = \Sigma_0^m M_i \quad (1);$$

where $M_{DA}$ is the sum of $M_i$ for each of instruction sets with indices 0-n. In such examples, a lower $M_{DA}$ indicates a more favorable or positive performance.

In some arrangements, the efficiency metric $M_E$ for a given dynamic asset 130 can be defined as a total distance traveled by the dynamic asset 130 within a predetermined time period (e.g., 1 hour, 3 hours, 24 hours, and so on). The predetermined time period for $M_E$ can be the same as the predetermined time period for $M_{DA}$. The distance traveled by the dynamic asset 130 is determined using the actual distance traveled by the dynamic asset 130 as detected using the base stations and tags as described herein. For example, incremental distance between two locations of the dynamic asset 130 sampled according to a time granularity (e.g., 1 second, 2 seconds, 5 seconds, 10 seconds, and so on) can be aggregated over the predetermined time period. The shorter the distance traveled (e.g., a lower $M_E$) indicates a more favorable or positive performance.

In some arrangements, the assignment verification metric $M_{AV}$ can be defined as an indicator for whether an assignment (e.g., a semi-dynamic asset 140 being assigned to a dynamic asset 130 or to a stationary asset) as indicated in the instructions (e.g., as shown in FIG. 15) is properly executed. For example, the server 150 can perform the method 900 for verifying that the first asset (e.g., a semi-dynamic asset 140) being moved by the second asset (e.g., the dynamic asset 130) is appropriate. For example, the server 150 can perform the method 1000 for verifying that the first asset being placed on or adjacent to the third asset (e.g., a stationary asset 120) is appropriate. As shown in FIG. 14, each instruction set can have at least one assignment or changes in assignment, for which $M_{AV}$ can be calculated. In some examples, $M_{AV}=0$ indicates that the assignment is verified, and $M_{AV}=1$ indicates that the assignment is not verified (the operation has failed). A lower $M_{AV}$ indicates a more favorable or positive performance.

In some arrangements, the time-to-completion metric $M_{TTC}$ can be defined as a time duration within which an instruction set is executed by a given dynamic asset 130. In some examples, $M_{TTC}$ can be determined by the difference between a first timestamp indicating the start of executing an instruction set and a timestamp indicating the end of performing the instruction set. A lower $M_{TTC}$ indicates a more favorable or positive performance.

In some arrangements, the idle-time metric $M_{IDL}$ can be defined as a time duration within which a given dynamic asset 130 is not executing any instruction sets. Idle time can be due to the dynamic asset 130 not being assigned any instruction sets, after having executed previously allowed instruction sets. A lower $M_{IDL}$ indicates a more favorable or positive performance.

The different types of metric can measure different aspects of the performance of the ML model 270 based on different granularity level such as per dynamic asset, per instruction set, per assignment, per time period, and so on. The metric for different instruction sets of a dynamic asset 130 can be aggregated (e.g., added) within a period of time to determine the metric for dynamic asset 130. The metric for different dynamic assets 130, different time periods, different assignments, can be aggregated to determine a combine metric for the facility 101. Each of the metrics described herein can be weighed (e.g., multiplied by a multiplier) to tune its impact on the ML model 270. The ML model 270 can be automatically updated based on the reward framework defined by the metrics. Although in the examples shown, a lower metric value generally indicates a more favorable and positive performance, other implementations allow a higher metric value to indicate a more favorable and positive performance. Such mechanism can be reinforced learning and avoids human intervention as in supervised learning.

Figure 16:
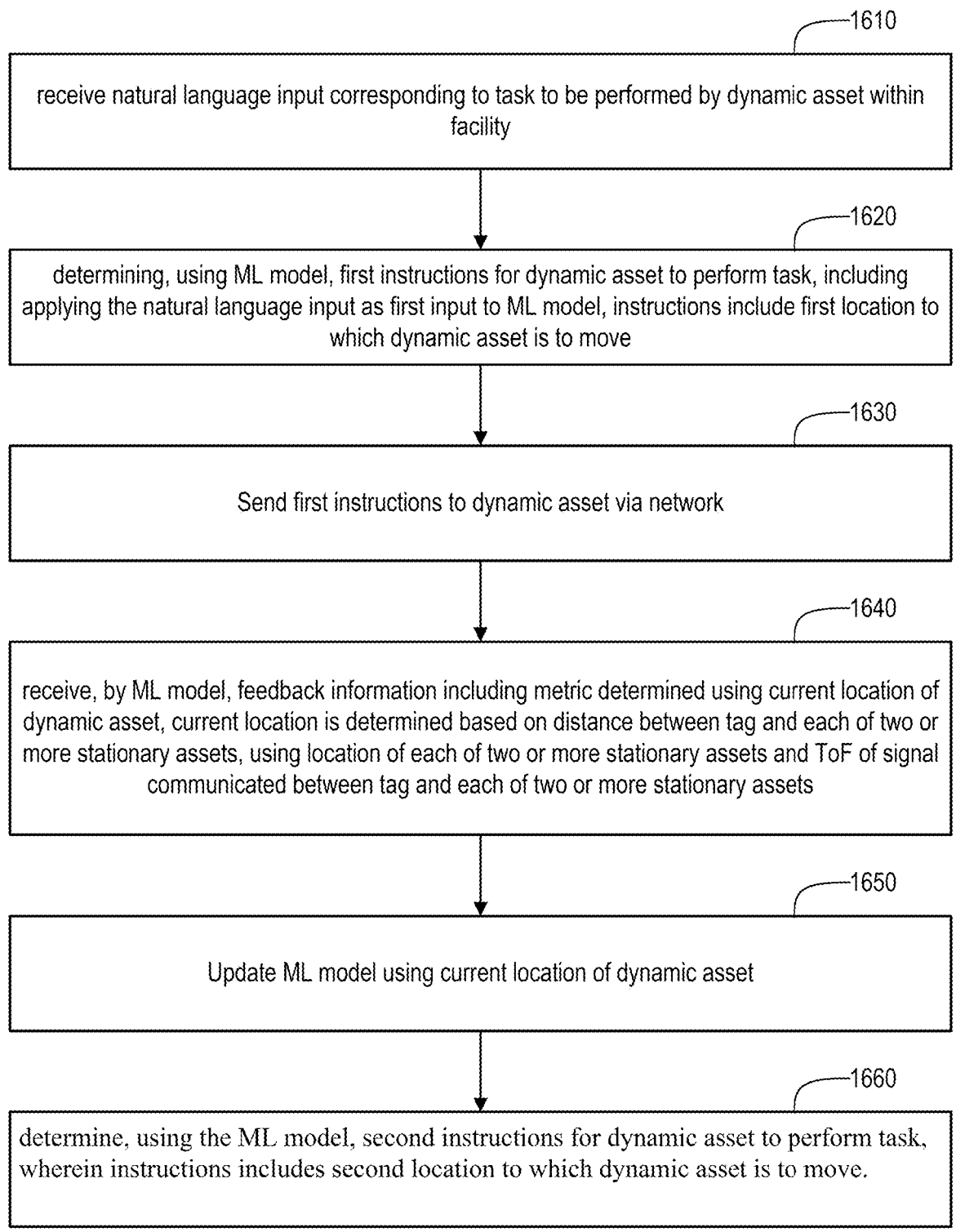
FIG. 16 is a flowchart diagram illustrating an example method for training the ML model to generate instructions for a dynamic asset, according to various arrangements.

FIG. 16 is a flowchart diagram illustrating an example method 1600 for training (e.g., updating) the ML model 270 to generate instructions for a dynamic asset 130, according to various arrangements. The method 1600 can be implemented to fine-tune the ML mode 270, which may be pre-trained, to downstream tasks to adapt to different facility layouts and assets. Thus, the method 1600 can provide training of the ML model 270 while the ML model 270 is outputting instructions 1220 to the dynamic asset 130 to move and operate within the facility 101.

At 1610, the ML model 270 receives the natural language input 1210 corresponding to a task to be performed by a dynamic asset 130 within the facility 101. At 1620, the ML model 270 determines first instructions (e.g., the instructions 1220) for the dynamic asset 130 to perform the task. Determining the first instructions includes applying the natural language input 1210 as a first input to the ML model 270. The first instructions includes a first location (e.g., a first waypoint) to which the dynamic asset 130 is to move.

At 1630, the server 150 sends the first instructions (e.g., the instructions 1220) to the dynamic asset 130 via the network 205. At 1640, the ML model 270 receives the feedback information 1230 including a metric determined using a current location of the dynamic asset 130. The current location is determined based on a distance between a tag and each of two or more stationary assets 120, using a location of each of the two or more stationary assets 120 and a ToF of a signal communicated between the tag and each of the two or more stationary assets 120.

At 1650, the ML model 270 is updated using the current location of the dynamic asset 130. At 1660, the ML model 270 determines second instructions (e.g., the instructions 1220) for the dynamic asset 130 to perform the task. The second instructions includes a second location (e.g., a waypoint) to which the dynamic asset 130 is to move. In some examples, the second instructions are the instructions 1220 that are generated by the ML model 270 based on the feedback information 1230.

In some arrangements, determining the first instructions further includes applying as second input to the ML model 270, at least one of first information stored in a map database, second information stored in an asset database, or third information stored in a records database.

In some arrangements, the first information includes at least one of a first map of the facility 101, a second map of the facility 101, or a third map of the facility 101. The first map includes, in a 2D or 3D coordinate system, a current location of each of a plurality of stationary assets of the facility, a current location of each of a plurality of semi-dynamic assets of the facility, and a current location of each of a plurality of dynamic assets of the facility, wherein the plurality of dynamic assets comprises the dynamic asset. The second map is generated by the dynamic asset 130 using at least one sensor thereon, the dynamic asset includes a vehicle, the second map comprises a SLAM map. The third map includes a CAD drawing.

In some examples, the first information includes two or more of the first map, the second map, or the third map. In some examples, the second information includes, for each of a plurality of assets a tag ID of a tag provided on each of the plurality of assets and at least one of an asset type, an asset name, an asset ID, or a product code. The plurality of assets includes the dynamic asset and a semi-dynamic asset being moved by the dynamic asset. In some examples, the third information includes assignment information describing at least one of the dynamic asset being assigned to move a semi-dynamic asset or a stationary asset is assigned to store the semi-dynamic asset.

In some arrangements, the first instructions includes a plurality of instruction sets, each of the plurality of instruction sets includes at least one waypoint. The metric includes an instruction set metric for each of the plurality of instruction sets. The instruction set metric for each of the plurality of instruction sets is determined based on a distance between the dynamic asset and one of the at least one waypoint in each of the plurality of instruction sets in response to each of the plurality of instruction sets being executed, a distance between the dynamic asset and a semi-dynamic asset in response to each of the plurality of instruction sets being executed, or a distance between the dynamic asset and a stationary asset in response to each of the plurality of instruction sets being executed.

In some arrangements, the metric includes a dynamic asset metric determined by combining the instruction set metric for each of the plurality of instruction sets sent to the dynamic asset within a predetermined time period. In some arrangements, the metric includes an efficiency metric determined using a total distance traveled by the dynamic asset over a predetermined time period. In some arrangements, the metric includes an assignment verification metric determined by at least one of verifying whether a semi-dynamic asset is assigned to the dynamic asset based on a distance between the semi-dynamic asset and the dynamic asset or verifying whether a semi-dynamic asset is assigned to a stationary asset based on a distance between the semi-dynamic asset and the stationary asset. In some arrangements, the metric includes a time-to-completion metric determined as a time duration within which the first instructions are executed by the dynamic asset. In some arrangements, the metric includes an idle-time metric determined as a time duration within which the dynamic asset is idle without executing any instructions.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a digital signal processor (DSP), an application specific integrated circuit (ASIC), a field programmable gate array (FPGA), Graphics Processing Unit (GPU), or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A system, comprising:
two or more stationary assets, each of the two or more stationary asset comprises a tag, a transmitter, and a receiver for communicating a signal with the tag;
a dynamic asset comprising a vehicle;
at least one memory; and
at least one processor configured to:
receive natural language input corresponding to a task to be performed by the dynamic asset within a facility;
determine, using a Machine Learning (ML) model, first instructions for the dynamic asset to perform the task, wherein determining the first instructions comprises applying the natural language input as a first input to the ML model, wherein the first instructions comprise a first location to which the dynamic asset is to move;
transmit the first instructions to the dynamic asset via a network;
execute the first instructions by the dynamic asset to perform the task comprising moving a current location of the dynamic asset;
receive, by the ML model, feedback information comprising a metric determined using the current location of the dynamic asset, wherein the current location is determined based on a distance between the tag and each of the two or more stationary assets, using a location of each of the two or more stationary assets and a Time-of-Flight (ToF) of the signal communicated between the tag and each of the two or more stationary assets;
update the ML model using the current location of the dynamic asset using reinforced learning, comprising:
determining a dynamic asset metric based on a distance between the current location of the dynamic asset and a location in the first instructions;
determining an efficiency metric using a total distance traveled by the dynamic asset within a predetermined time period by aggregating incremental distances between two locations of the dynamic asset sampled according to a time granularity over the predetermined period;
determining an assignment verification metric comprising verifying whether a semi-dynamic asset being moved by the dynamic asset is appropriate by verifying that a distance between the current location of the dynamic asset and a current location of the semi-dynamic asset being within a predetermined range;
determining a time-to-completion metric according to a difference between a first timestamp indicating the start of executing the first instructions and a timestamp indicating the end of performing the first instructions;

determining an idle-time metric according to a time duration within which the dynamic asset is not executing any instructions;

defining a reward framework comprising indication of positive performance and negative performance based on the metric comprising an aggregate of the dynamic asset metric, the efficiency metric, the assignment verification metric, the time-to-completion metric, and the idle-time metric; and updating the ML model using the reward framework;

determine, using the updated ML model, second instructions for the dynamic asset to perform the task, wherein the second instructions comprise a second location to which the dynamic asset is to move;

transmit the second instructions to the dynamic asset;

execute the second instructions by the dynamic asset to perform the task comprising moving a current location of the dynamic asset;

generate a first map of the facility including the current location of the dynamic asset, wherein the first map comprises, in a 2-Dimensional (2D) or 3-Dimensional (3D) coordinate system, a current location of each of a plurality of stationary assets of the facility, a current location of each of a plurality of semi-dynamic assets of the facility, and a current location of each of a plurality of dynamic assets of the facility, wherein the plurality of dynamic assets comprises the dynamic asset;

update a second map and a third map based on the first map, the second map being generated by the dynamic asset using at least one sensor thereon, the dynamic asset comprises a vehicle, the second map comprises a Simultaneous Localization and Mapping (SLAM) map, and the third map comprises a Computer-Aided Design (CAD) drawing, wherein updating the second map and the third map comprises:

translate coordinates of the dynamic asset defining the second location in the first map to coordinates of the dynamic asset defining the second location in the second map; and translate coordinates of the dynamic asset defining the second location in the first map to coordinates of the dynamic asset defining the second location in the third map.

2. The system of claim 1, wherein determining the first instructions further comprises applying as second input to the ML model, at least one of:

first information stored in a map database;

second information stored in an asset database; or third information stored in a records database.

3. The system of claim 2, wherein the first information comprises the first map, the second map, and the third map.

4. The system of claim 2, wherein the second information comprises, for each of a plurality of assets:

a tag Identifier (ID) of a tag provided on each of the plurality of assets; and at least one of:
an asset type;
an asset name;
an asset ID; or
a product code, wherein the plurality of assets comprises the dynamic asset and a semi-dynamic asset being moved by the dynamic asset.

5. The system of claim 2, wherein the third information comprises assignment information describing at least one of:

the dynamic asset being assigned to move a semi-dynamic asset; or a stationary asset is assigned to store the semi-dynamic asset.

6. The system of claim 1, wherein the first instructions comprise a plurality of instruction sets, each of the plurality of instruction sets comprises at least one waypoint;

the metric comprises an instruction set metric for each of the plurality of instruction sets; and the instruction set metric for each of the plurality of instruction sets is determined based on:

a distance between the dynamic asset and one of the at least one waypoint in each of the plurality of instruction sets in response to each of the plurality of instruction sets being executed;

a distance between the dynamic asset and a semi-dynamic asset in response to each of the plurality of instruction sets being executed; or a distance between the dynamic asset and a stationary asset in response to each of the plurality of instruction sets being executed.

7. The system of claim 6, wherein the dynamic asset metric is determined by combining the instruction set metric for each of the plurality of instruction sets sent to the dynamic asset within a predetermined time period.

8. The system of claim 1, wherein the assignment verification metric determined by verifying whether a semi-dynamic asset is assigned to a stationary asset based on a distance between the semi-dynamic asset and the stationary asset.

9. The system of claim 1, wherein the metric is determined using at least one of the first map, the second map, or the third map.

* * * * *